(12) United States Patent
Hall

(10) Patent No.: US 7,296,029 B2
(45) Date of Patent: Nov. 13, 2007

(54) ENVIRONMENTALLY RESPONSIVE OSCILLATING CIRCULAR AFFINITY INDEX

(75) Inventor: Norman Allen Hall, Thousand Oaks, CA (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 10/964,430

(22) Filed: Oct. 12, 2004

(65) Prior Publication Data

US 2006/0080332 A1   Apr. 13, 2006

(51) Int. Cl.
*G06F 17/30* (2006.01)

(52) U.S. Cl. .................. 707/100; 707/200; 707/101; 711/110; 711/220

(58) Field of Classification Search .......... 707/200, 707/101, 1, 100; 718/102; 711/110, 206
See application file for complete search history.

(56) References Cited

U.S. PATENT DOCUMENTS

| | | | | |
|---|---|---|---|---|
| 5,829,005 | A * | 10/1998 | Senator | 707/100 |
| 6,122,626 | A | 9/2000 | Brandsma | 707/3 |
| 6,223,171 | B1 | 4/2001 | Chaudhuri et al. | 707/2 |
| 6,266,658 | B1 | 7/2001 | Adya et al. | 707/2 |
| 6,338,056 | B1 | 1/2002 | Dessloch et al. | 707/2 |
| 6,363,470 | B1 * | 3/2002 | Laurenti et al. | 711/220 |
| 6,438,562 | B1 | 8/2002 | Gupta et al. | 707/201 |
| 6,567,817 | B1 * | 5/2003 | VanLeer | 707/102 |
| 6,584,458 | B1 | 6/2003 | Millett et al. | 707/3 |
| 6,671,694 | B2 | 12/2003 | Baskins et al. | 707/102 |
| 6,721,723 | B1 * | 4/2004 | Gibson et al. | 707/2 |
| 6,782,447 | B2 * | 8/2004 | Ostler et al. | 711/110 |
| 6,859,808 | B1 * | 2/2005 | Chong et al. | 707/101 |
| 6,883,006 | B2 * | 4/2005 | Webber | 707/100 |
| 7,085,911 | B2 * | 8/2006 | Sachedina et al. | 711/206 |
| 2002/0049753 | A1 | 4/2002 | Burrows | 707/3 |
| 2002/0059185 | A1* | 5/2002 | Woo | 707/1 |
| 2002/0059271 | A1* | 5/2002 | Bae | 707/100 |
| 2003/0093408 | A1 | 5/2003 | Brown et al. | 707/2 |
| 2003/0182291 | A1 | 9/2003 | Kurupati et al. | 707/100 |
| 2004/0015469 | A1 | 1/2004 | Beier et al. | 707/1 |
| 2004/0098721 | A1* | 5/2004 | Alverson et al. | 718/102 |

OTHER PUBLICATIONS

Curtis P. Kolovson, Segment indexes: dynamic indexing techniques for multi-dimensional interval data, 1991, ACM Press New York, NY, USA , International Conference on Management of Data, Proceedings of the 1991 ACM SIGMOD international conference on Management of data, pp. 138-147.*

(Continued)

*Primary Examiner*—Pierre Vital
*Assistant Examiner*—Hexing Liu
(74) *Attorney, Agent, or Firm*—Janet M. Skafar; Gregory M. Plow

(57) ABSTRACT

Various embodiments of a method, apparatus and article of manufacture to manage an index are provided. A circular index, having an index size, is provided. The circular index stores information to reference data in a sequential list. Accesses to the index and the list are monitored to provide at least one performance indicator. The performance indicator represents an effect of the index on accessing items in the list. The index size is changed based on the at least one performance indicator. The monitoring of the accesses and the changing of the index size are repeated.

30 Claims, 14 Drawing Sheets

OTHER PUBLICATIONS

Brian F. Cooper, A parallel index for semistructured data, 2002, ACM Press New York, NY, USA, Symposium on Applied Computing, Proceedings of the 2002 ACM symposium on Applied computing, pp. 890-896.*

IBM IMS Performance Monitor for z/OS, Version 1.1, [online]. Dec. 2003. [retrieved on Oct. 8, 2004]. Retrieved from the Internet: <URL: http://www-306.ibm.com/software/data/db2imstools/pdf/imspmv1.pdf>.

* cited by examiner

ENVIRONMENTALLY RESPONSIVE OSCILLATING CIRCULAR AFFINITY INDEX

BACKGROUND OF THE INVENTION 1.0 Field of the Invention

This invention relates to an index to reference a list of data, and more particularly to an environmentally responsive oscillating circular affinity (EROCA) index.

2.0 Description of the Related Art

Many software applications use lists to sequentially store items of data. When an item of data in the list is referenced, the list is typically searched sequentially starting at the top of the list. When the size of the list becomes large, the amount of time to access a desired item can become large if that item is near the end of the list. Therefore a search can take a long time, and provide a slow response to a user.

To reduce the access time, an index to the most frequently referenced items in the list could be provided. However, maintaining a rigid most-frequently-referenced index may not be advantageous in those cases when the more recently referenced items are most likely to be referenced again. Using the most-frequently-referenced indexing technique, those items which are referenced, that is, accessed, more recently but less often may not remain in the index. For example, if a subset of items were referenced very frequently for a short period of time that subset of items would be stored in the index; however, after that period of time had passed and that subset of items is no longer referenced, that subset of items would dominate the index and provide no benefit.

One solution would be to increase the size of the index to increase the likelihood of storing the most recently referenced items. However, this solution may result in a very long index and possibly increase, rather the decrease, the average access time.

Therefore there is a need for an improved indexing technique to allow most-recently referenced items in a sequential list to be accessed efficiently.

SUMMARY OF THE INVENTION

To overcome the limitations in the prior art described above, and to overcome other limitations that will become apparent upon reading and understanding the present specification, various embodiments of a method, apparatus and article of manufacture are provided to manage an index. A circular index, having an index size, is provided. The circular index stores information to reference data in a sequential list. Accesses to the index and to the list are monitored to provide at least one performance indicator. The performance indicator represents an effect of the index on accessing items in the list. The index size is changed based on the at least one performance indicator. The monitoring of the accesses and the changing of the index size are repeated.

In various embodiments, the at least one performance indicator comprises a current performance indicator. The index size is adjusted in response to the current performance indicator indicating that the index increases an amount of time to access items in the list. In some embodiments, the index size is adjusted in response to the current performance indicator indicating that the index decreases an amount of time to access items in the list.

In other embodiments, the monitoring of the index and the list, and the changing of the index size are performed at a predetermined interval. In some embodiments, the index size oscillates between an upper size boundary and a next lower size. In various embodiments, the index size oscillates between a lower size boundary and a next higher size.

In this way, an improved technique for managing an index is provided. This technique allows most-recently referenced items in a sequential list to be accessed efficiently.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to manage an index to a list. In various embodiments, a method, apparatus and article of manufacture are provided to manage an index. A circular index, having an index size, is provided. Accesses to the index and to the list are monitored to provide at least one performance indicator. The performance indicator represents an effect of the index on accessing items in the list. The index size is changed based on the at least one performance indicator. The monitoring of the accesses and the changing of the index size are repeated.

Figure 1:
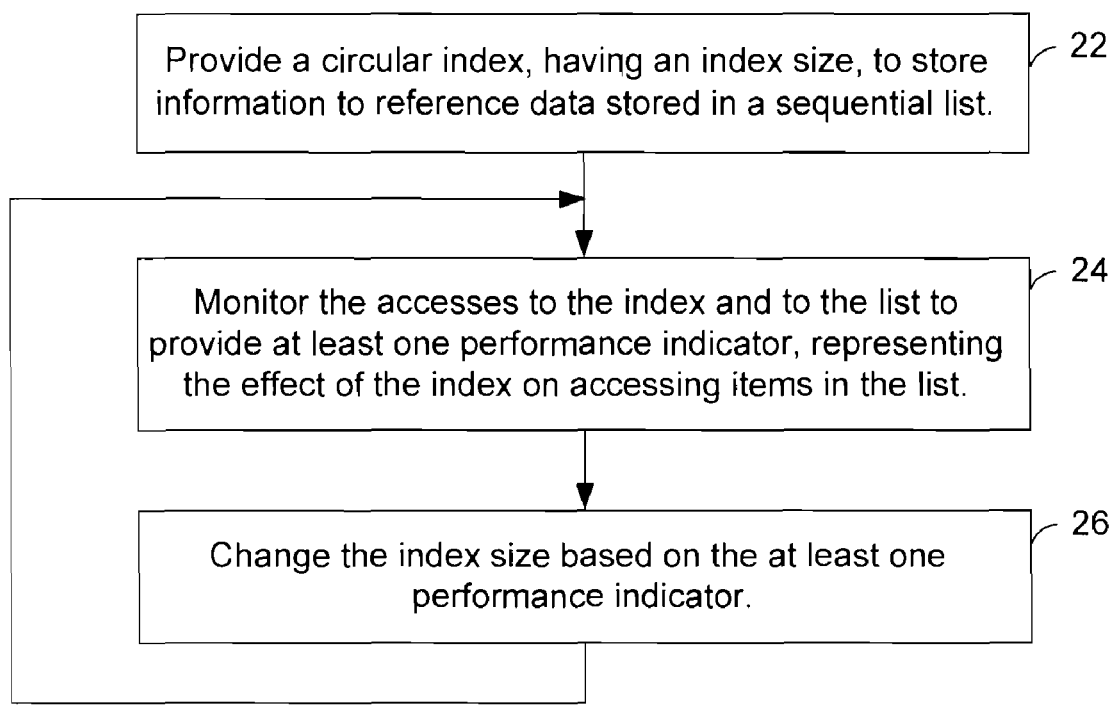
FIG. 1 depicts a high-level flowchart of an embodiment of a technique to manage an index.

FIG. 1 depicts a high-level flowchart of an embodiment of a technique to manage an index. In step 22, a circular index is provided. The circular index has an index size. The index stores information to reference data stored in a sequential list. In step 24, the accesses, or references, to the index and to the list are monitored to provide at least one performance indicator. The performance indicator represents the effect of the index on accessing items in the list. In step 26, the index size is changed based on at least one performance indicator. Step 26 proceeds to step 24 to repeat the monitoring and changing steps. The flowchart of FIG. 1 is shown as an infinite loop. In other embodiments, the repeating of the monitoring and changing steps can be performed for a predetermined period of time or stopped by a user.

In some embodiments, the at least one performance indicator comprises a current performance indicator and a previous performance indicator. The current performance indicator represents the effect of the index on accessing items in the list during a current time interval. The previous performance indicator represents the effect of the index on accessing items in the list during a previous time interval.

In various embodiments, the performance indicator is a performance improvement indicator. When the performance improvement indicator is positive, the index reduces the time to access items in the list. When the performance improvement indicator is negative, the index increases the time to access items in the list.

In various embodiments, the monitoring and changing steps are repeated at a predetermined interval. In some embodiments, when the current performance improvement indicator is greater than the previous performance improvement indicator, the index continued to reduce the access time of the items in the list, therefore the index size is increased. In various embodiments, when the current performance improvement indicator indicates that the index does not reduce the access time as much as the previous performance improvement indicator, the index size is decreased. In some embodiments, when the current performance improvement indicator indicates that the index increases the access time of the items in the list, the index size is decreased.

In various embodiments, the monitoring of the accessing of the index and the list and the changing of the index size are repeated at intervals. In some embodiments, the size of the index oscillates. In various embodiments, the size of the index oscillates between an upper boundary and a next lower index size. In some embodiments, the size of the index oscillates between a lower boundary and a next higher index size.

Figure 2:
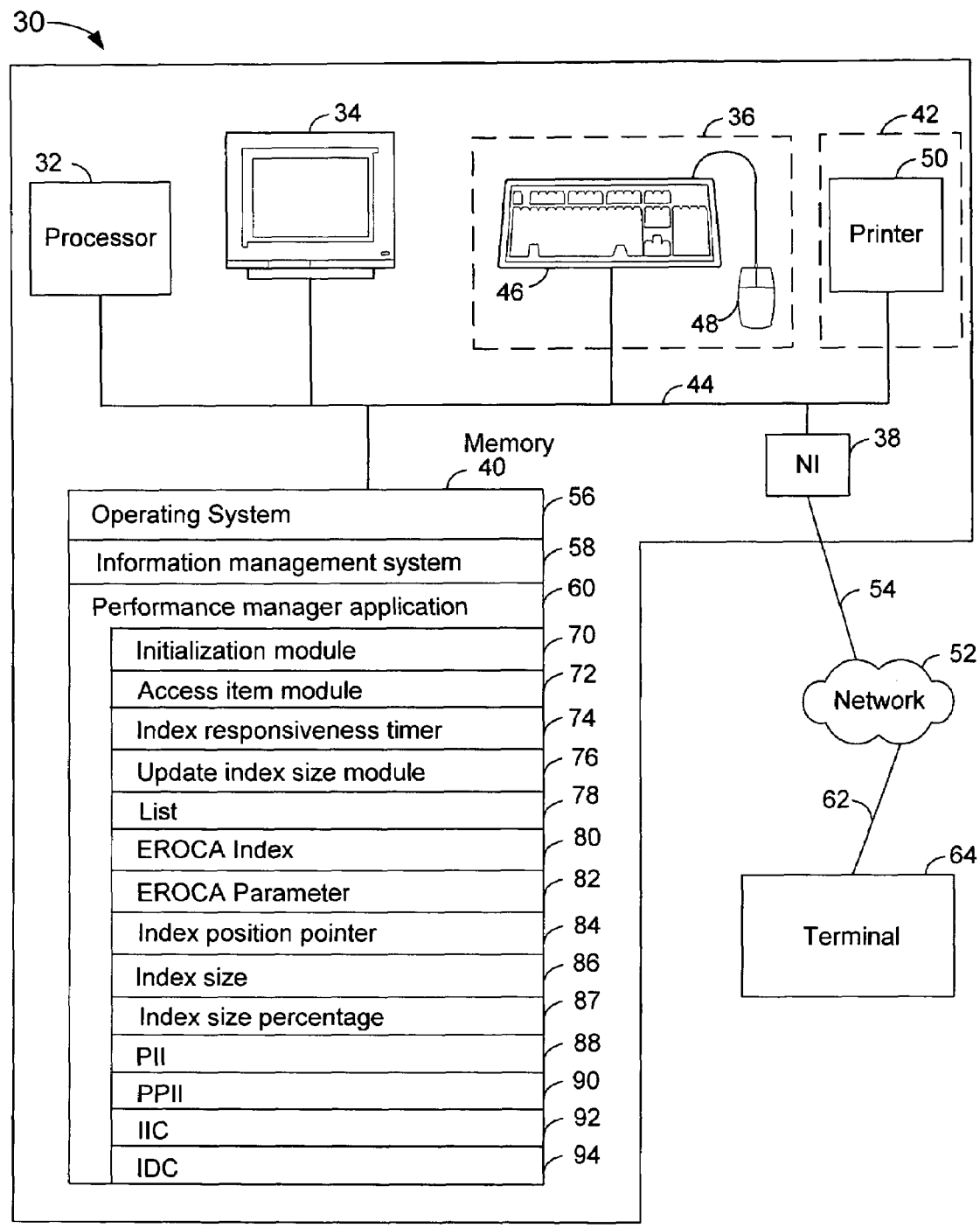
FIG. 2 depicts an illustrative computer system which uses various embodiments of the present invention.

FIG. 2 depicts an illustrative computer system 30 which uses various embodiments of the present invention. The computer system 30 comprises a processor 32, display 34, input interfaces (I/F) 36, communications interface 38, memory 40 and output interface(s) 42, all conventionally coupled by one or more buses 44. The input interfaces 36 comprise a keyboard 46 and a mouse 48. The output interface 42 comprises a printer 50. The communications interface 38 is a network interface (NI) that allows the computer system 30 to communicate via a network 52, such as the Internet. The communications interface 38 may be coupled to a transmission medium 54 such as a network transmission line, for example twisted pair, coaxial cable or fiber optic cable. In another embodiment, the communications interface 38 provides a wireless interface, that is, the communications interface 38 uses a wireless transmission medium.

The memory 40 generally comprises different modalities, illustratively semiconductor memory, such as random access memory (RAM), and disk drives. In various embodiments, the memory 40 stores an operating system 56, an information management system 58, and a performance manager application 60.

In some embodiments, the network 52 is connected, via another transmission medium 62, to one or more terminals 64. In some embodiments, a terminal may be another computer or a transactional device such as an automated teller machine (ATM), a cash register, an order entry terminal such as auto parts order entry, an Internet browser to track express shipping packages, and an Internet browser for retail purchases.

In various embodiments, the information management system 58 is IBM® (Registered trademark of International Business Machines Corporation) IMS™ (Trademark of International Business Machines Corporation) and the terminals 64 are IMS terminals. However, the invention is not meant to be limited to IBM IMS and may be used with other applications, for example, a database management system, and in the operating system internals such as demand-paging, time-slicing or dispatching.

In various embodiments, the performance manager application 60 comprises an initialization module 70, an access item module 72, an index responsiveness timer 74, an update index size module 76, a list 78, an EROCA index 80, an EROCA parameter 82, an index position pointer 84, an index size 86, an index size percentage 87, a performance improvement indicator (PII) 88, a previous performance improvement indicator (PPII) 90, an index improvement count (IIC) 92 and an index detriment count (IDC) 94 which will be described in further detail below.

In various embodiments, the specific software instructions, data structures and data that implement various embodiments of the present invention are typically incorporated in the performance manager application 60. Generally, an embodiment of the present invention is tangibly embodied in a computer-readable medium, for example, the memory 40 and is comprised of instructions which, when executed by the processor 32, causes the computer system 30 to utilize the present invention. The memory 40 may store the software instructions, data structures and data for any of the operating system 56, the information management system 58 and the performance manager application 60, in semiconductor memory, in disk memory, or a combination thereof.

The operating system 56 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 2 is not intended to limit the present invention. Other alternative hardware environments may be used without departing from the scope of the present invention.

Figure 3:
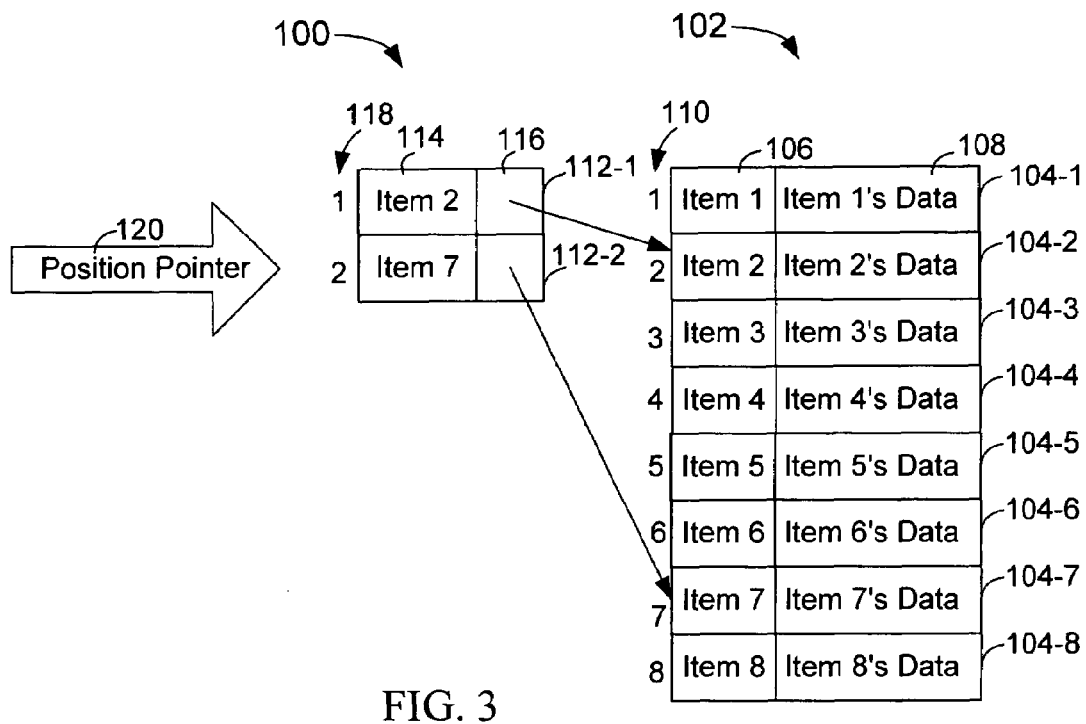
FIG. 3 depicts a diagram of an exemplary EROCA index and list.

FIG. 3 depicts an exemplary environmentally responsive oscillating circular affinity index 100 and list 102. The list 102 comprises list elements 104-1 to 104-8. The list 102 is typically a sequential list. A list element 104 comprises an item 106 and data 108 associated with that item. An item 106 is data upon which a search is performed. The list 102 has a list size which represents the number of list elements making up the list. For example, the list size of the list 102 is equal to eight. Each list element 104 is associated with a list position 110 which is shown to the left of its associated list element.

The index 100 comprises index elements 112-1 and 112-2. An index element 112 contains an item 114 and a pointer 116 to that item in the list 102, that is, the list position. The index 100 has an index size. The index 100 of FIG. 3 is twenty-five percent of the size of the list. In this example, the index has two index elements; therefore the index size is equal to two. Each index element 112 is associated with an index position. The index position 118 is shown to the left of its associated index element. The index 100 has a start index position and an end index position, for example, index positions one and two, respectively. The index 100 is circular. Starting with index element one 112-1 at index position one, items and their associated list position, are sequentially added to the index elements of the index. An index position pointer 120 is used to point to a next element to be updated with a new item and associated list pointer. After adding an item to the ending element in the list, the index position pointer 120 is then set to point to the start index position, that is, index position one.

In other embodiments, the list 102 of FIG. 3 may have x list elements and the index 100 has a number y of index elements proportional to the number of list elements.

In various embodiments, a list block comprises one or more list elements and, in some embodiments, the space for the list is allocated in list blocks. The list block size refers to the number of list elements in the list block. The list block size is typically predetermined.

In various embodiments, an index block comprises one or more index elements and the space for the index is allocated in index blocks. The index block size refers to the number of index elements in the index block. Typically, the number of index elements in the index block is predetermined.

Figure 4:
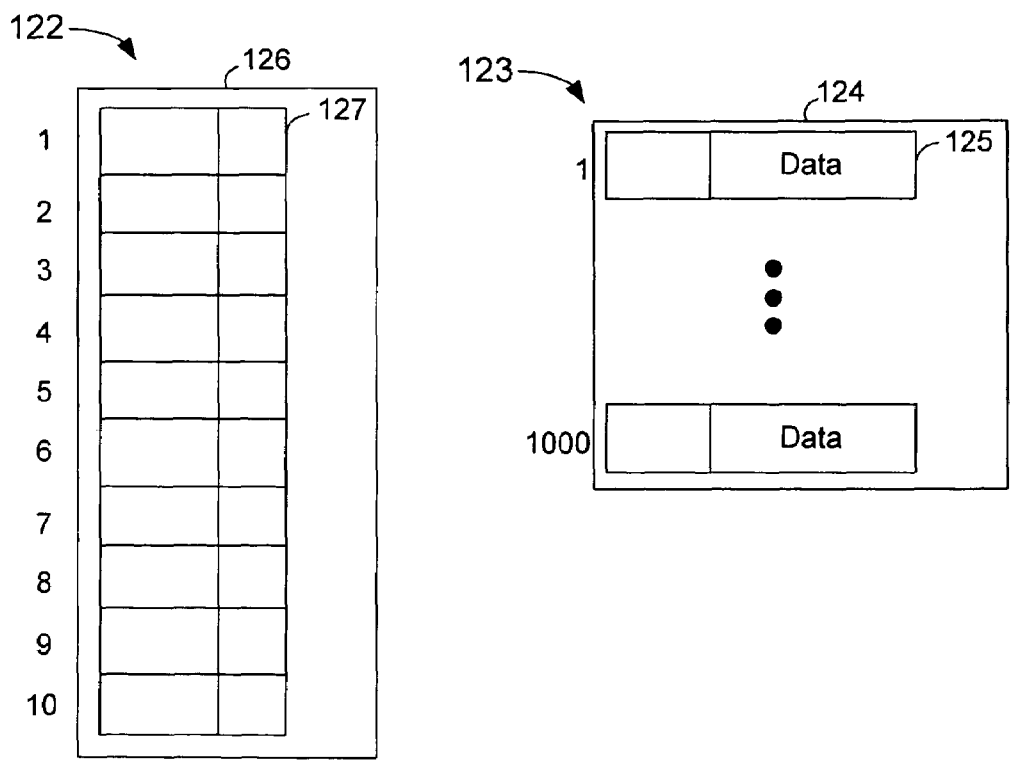
FIG. 4 depicts a diagram of another exemplary EROCA index and list.

FIG. 4 depicts another exemplary EROCA index 122 and list 123. The list 123 comprises one list block 124. The list block has 1,000 list elements 125, and the list position is shown to the left of the list elements. However, the list block 124 is not meant to be limited to 1,000 list elements, and other numbers of list elements may be used. The EROCA index 122 comprises one index block 126. The index block 126 contains ten list elements 127 and the index position is shown to the left of the index elements. However, the index block 126 is not meant to be limited to ten list elements, and other numbers of list elements may be used. The index size may be expressed in terms of index elements and index blocks.

In various embodiments, the size of an index block is proportional to the size of a list block. For example, the index block size is equal to the product of the list block size and a predefined index block size percentage. In some embodiments, the index block size percentage is equal to one percent; however, the index block size percentage is not meant to be limited to one percent and other percentages may be used.

In various embodiments, the index size is equal to the list size multiplied by an index size percentage. The index size percentage for the index of FIG. 3 is equal to twenty-five percent. The index size percentage for the index and list of FIG. 4 is equal to one percent. However, the index size percentage is not meant to be limited to twenty-five percent or one percent and may be equal to other values.

In various embodiments, the EROCA index provides high-speed, low-storage-consumption location of items in a lengthy sequential list with the following reference pattern:

(1) If an item is located once, it is very likely that it will be located again in close time proximity.

(2) If an item is located once, it is likely that it will be located again many times.

(3) Some items are located many times and others only a few times.

(4) Located items tend to form subsets such that some subsets are located frequently during certain times, for example, during certain minutes of the day, relative to other subsets. These subsets tend to be small relative to the size of the entire set.

In some embodiments, for items with the reference pattern described above, on average, using the EROCA index to locate items in the list is exponentially faster than sequentially searching the list for those items.

In various embodiments, the EROCA index is designed to be very small relative to the size of the list that it indexes to conserve memory and to have very low management overhead to conserve processor or central processing unit (CPU) time. Conserving memory and CPU time are afforded, at least in part, because the EROCA index responds to environmental changes. Environmental changes include, and are not limited to, the reference pattern of items in the list.

In some embodiments, for the reference pattern identified in (1)-(4) above, a proportionally short index of a combination of the most-recently and more-frequently referenced items results in a significantly faster access time when compared to a sequential search of the list for a desired item. In various embodiments, the combination of low management overhead and a short index is accomplished by what is termed circular affinity.

Circular affinity is accomplished by maintaining the index position pointer. When the index becomes full, the index position pointer points to the oldest item in the index. As items in the list are accessed, the item and its associated list position, are added to the EROCA index unless that item is already in the index. When the index is full, the oldest item in the index is replaced by the most-recently-referenced item, provided that item is not already in the index. The index position pointer is then incremented to the next index position, which now contains the oldest item in the index. When the index position pointer reaches the end of the index, that is the last index element of the index, it circles back to point to the first index element in the index, that is, the index position pointer will next point to the start of the index. The result is that both the more-frequently and most-recently referenced items have a strong tendency, that is, affinity, to stay in the index.

To find an item in the list, the elements of the index are sequentially searched for the item starting at index position one. When the item is not found in the index, that item is then located by sequentially searching the list starting at list position one. When the item is found in the index, a speed advantage is provided when the value of the index position pointer for that item is less than the value of the list position pointer for that item.

Referring back to FIG. 3, for example, if both elements in the index 100 are searched to locate an item and that item is not found, and if that item is in the list element associated with the third list position, that is, list position three, in the sequential list, considering the overhead of managing the index 100, using the index 100 more than doubles the search time for that item. Therefore, in various embodiments, it is desirable that the index be designed such that, on average, the combination of index searches plus the overhead of maintaining the index improves the speed of searches for, that is, the speed of accessing, items. To improve the speed of searching for an item, in various embodiments, the performance of the index 100 is monitored and the size of the index 100 is changed based on the performance of the index.

Figure 5:
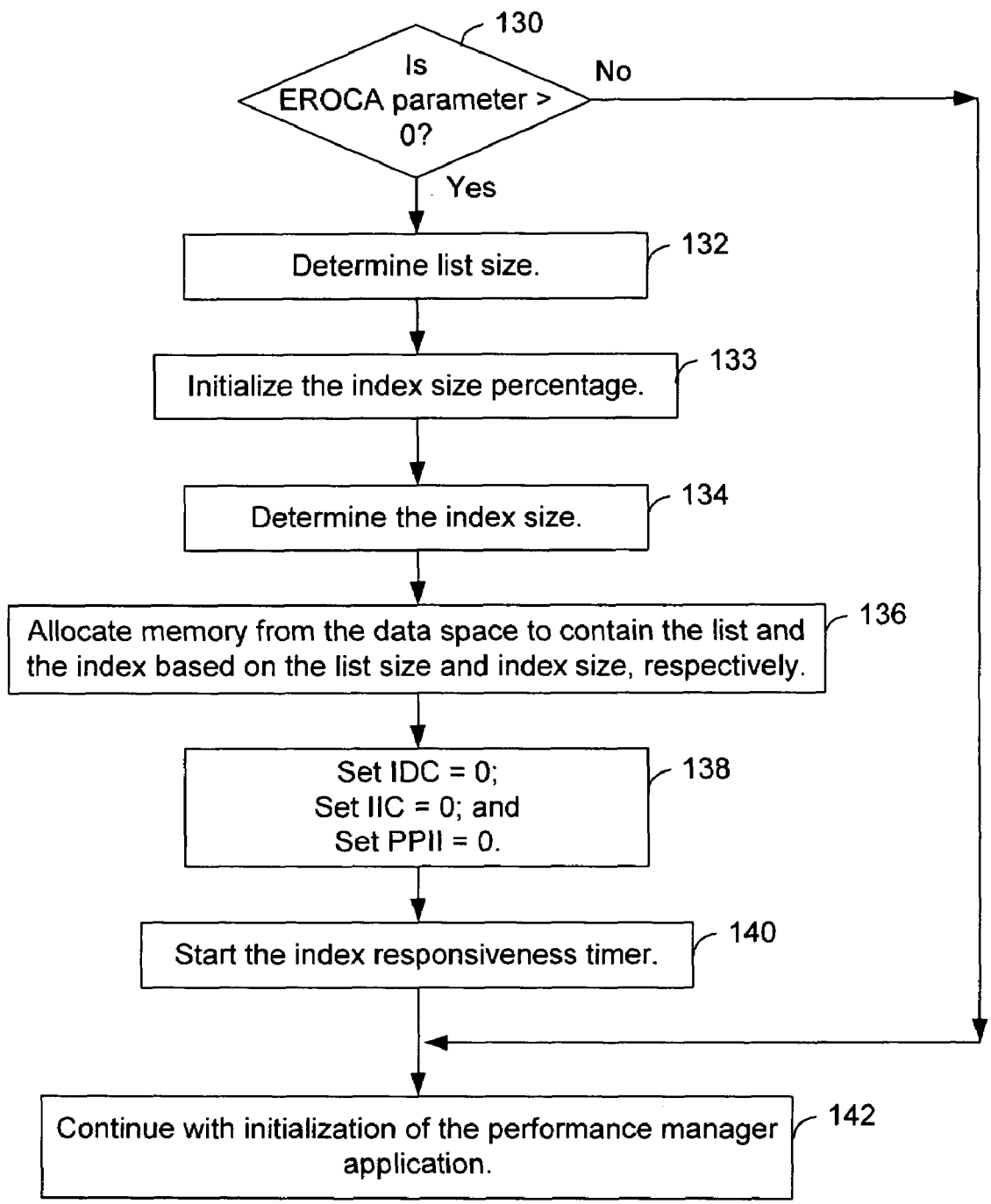
FIG. 5 depicts a flowchart of an embodiment of a technique to initialize the performance manager application of FIG. 2.

FIG. 5 depicts a flowchart of a technique to initialize the performance manager application 60 (FIG. 2). In some embodiments, the flowchart of FIG. 5 is implemented in the initialization module 70 of FIG. 2. The initialization module 70 (FIG. 2) initializes the index and starts the index responsiveness timer. Step 130 determines whether the EROCA parameter 82 (FIG. 2) is greater than zero. When the EROCA parameter is equal to zero, which is the default, the EROCA index is not used and the index responsiveness timer is not activated. When the EROCA parameter is greater than zero, the EROCA parameter indicates the size of the data space used to contain both the index and the list.

In response to step 130 determining that the EROCA parameter is greater than zero, in step 132, the list size is determined. In some embodiments, the list size is set equal to a predetermined size. In various embodiments, the list size is set to a predetermined number of list blocks having a predetermined list block size.

In step 133, the index size percentage is initialized. In some embodiments, the index size percentage is set to a predetermined value. For example, an index size percentage of one percent means that the number of index elements in the index is one percent of the number of list elements in the list. In some embodiments, the index size percentage is set equal to one percent. However, the index size percentage is not meant to be limited to one percent and other values may be used.

In step 134, the index size is determined. In various embodiments, the index size is set equal to the product of the list size and the index size percentage. In some embodiments, the index size is set equal to a predetermined number of index blocks having a predetermined index block size. In another embodiment, the number of index blocks is set equal to the number of list blocks; and the index size is set equal to the number of index blocks. For example, if there is one list block, the number of index blocks is equal to one.

In step 136, memory is allocated from the data space to contain the list and the index based on the list size and index size, that is, the number and size of the list blocks and index blocks.

In step 138, the index detriment count (IDC) 94 (FIG. 2) is set equal to zero, the index improvement count (IIC) 92 (FIG. 2) is set equal to zero, and the previous performance improvement indicator (PPII) 90 (FIG. 2) is set equal to zero.

In step 140, the index responsiveness timer 74 (FIG. 2) is started. The index responsiveness timer (IRT) is set to expire on an interval in order to respond to changes in the environment by changing the size of the index. In some embodiments, the interval is a predetermined interval. During the IRT interval, the index improvement count (IIC) and the index detriment count (IDC) are accumulated as the items are searched for.

In step 142, the initialization of the performance manager application continues. When step 130 determines that the EROCA parameter 82 (FIG. 2) is not greater than zero, step 130 proceeds to step 142.

In various embodiments, the performance of the index is monitored and the index size is changed in response to the monitoring. The index affects the accessing of an item. The index improvement count (IIC) 92 (FIG. 2) represents the reduced searching in terms of a number of elements, and therefore the reduced search time, due to the use of the index. When an item is found in the index, if the index position of the index element containing that item is less than or equal to the list position of the list element containing that item, a current improvement count is set to the list position minus the index position to reflect the improvement due to the index. During the IRT interval, the values of the current improvement count are accumulated in the index improvement count as items are searched for.

The index detriment count (IDC) 94 (FIG. 2) represents the excess searching in terms of a number of elements, and therefore the increased search time, due to the existence of the index. When an item is not found in the index, a current detriment count is set to the total number of items in the index; this reflects the search overhead incurred due to the existence of the index. Also, if the item was found in the index but the index position is greater than the sequential list position, the current detriment count is set to the index position minus the list position. During the IRT interval, values of the current detriment count are accumulated in the index detriment count as the items are searched for.

Figures 6, 6A, 6B:
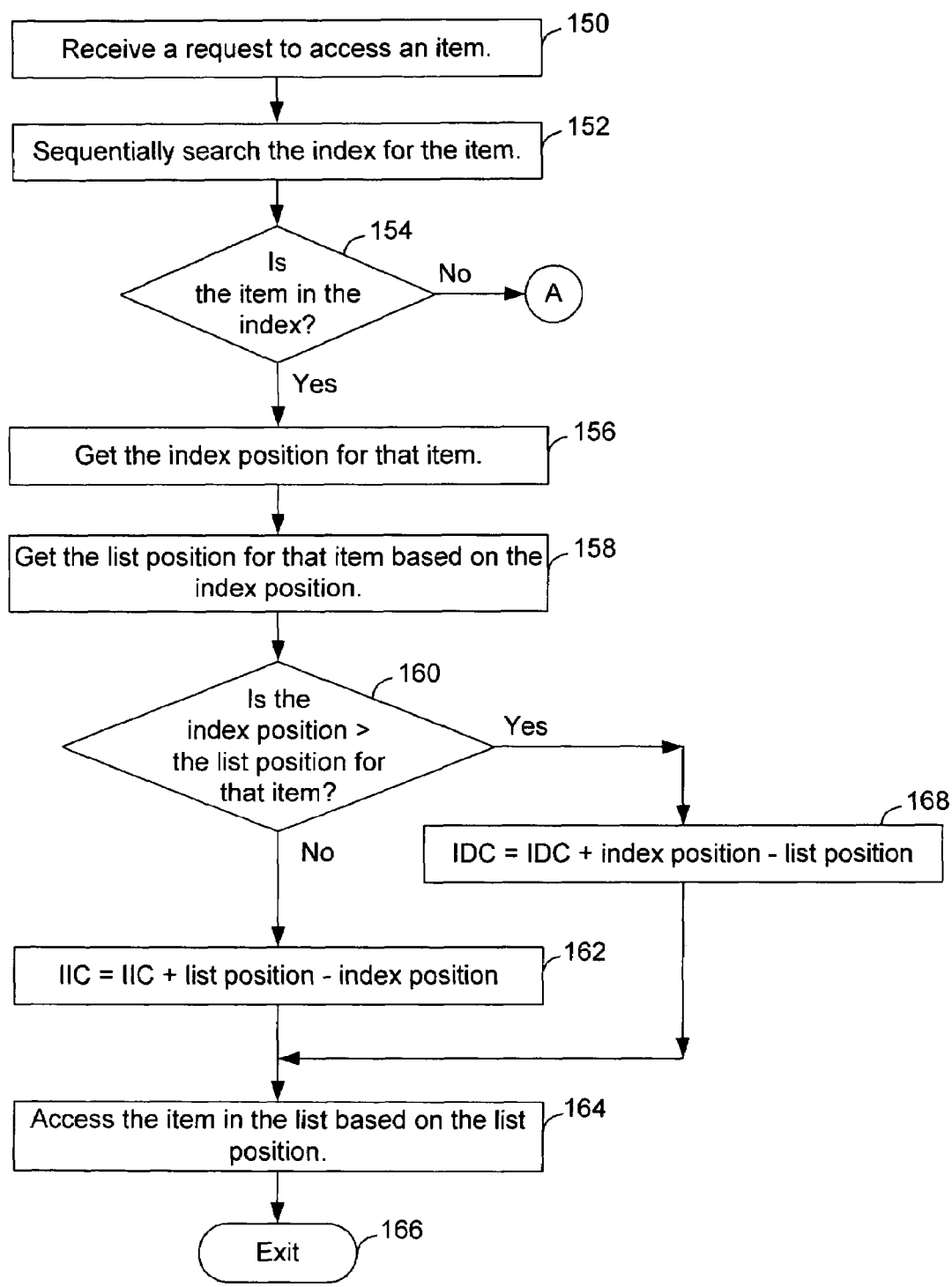
FIG. 6 comprises FIGS. 6A and 6B which collectively depict a flowchart of an embodiment of a technique to monitor the accesses to the index.
Figure 6B:
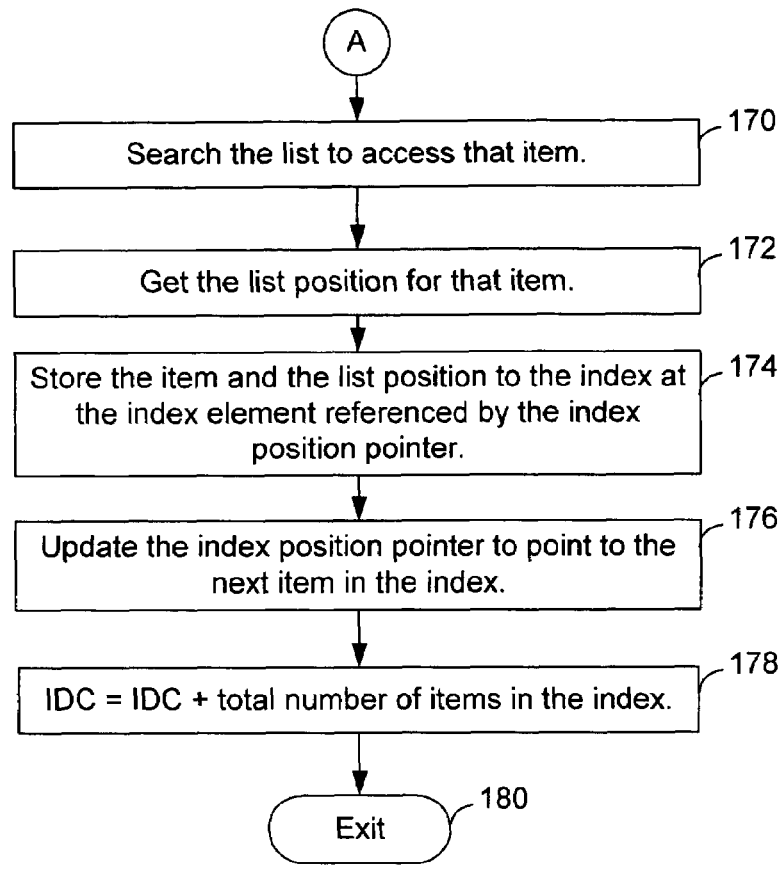

FIG. 6 comprises FIGS. 6A and 6B which collectively depict a flowchart of an embodiment of a technique to monitor the accesses to the index. In various embodiments, the flowchart of FIG. 6 is implemented in the access item module 72 of FIG. 2. In response to an item being accessed, either the index improvement count or the index detriment count is updated or accumulated. In some embodiments, every access to an item is monitored. In other embodiments, the accesses to the items are sampled so that a subset or portion of the accesses are monitored.

In step 150, a request to access an item is received. In step 152, the index is sequentially searched for the item. Step 154 determines whether the item is in the index. In response to step 154 determining that the item is in the index, in step 156, the access item module gets the index position for that item. In step 158, the access item module gets the list position for that item based on the index position. Step 160 determines whether the index position is greater than the list position for that item. When step 160 determines that the index position not is greater than the list position for that item, in step 162, the index improvement count (IIC) 92 (FIG. 2) is accumulated as follows: IIC=IIC+list position−index position. The value of "list position−index position" represents the current improvement count which is accumulated in the index improvement count. Alternately, the current improvement count is set equal to the value of the list position minus the index position, and the index improvement count is set equal to the sum of the index improvement count plus the current improvement count. In step 164, the item is accessed based on the list position. In step 166, the flowchart exits.

When step 160 determines that the index position is greater than the list position for that item, in step 168, the index detriment count (IDC) 94 (FIG. 2) is set equal to the index detriment count (IDC) plus the index position minus the list position. Alternately, the current detriment count is set equal to the index position minus the list position, and the index detriment count is incremented by the current detriment count. Step 168 proceeds to step 164.

In response to step 154 determining that the item is not in the index, step 154 continues via Continuator A to step 170 of FIG. 6B. In step 170, the list is sequentially searched to access that item. In step 172, the list position is retrieved for that item. In step 174, the list item and the list position are stored in the index at the location referenced by the index position pointer. In step 176, the index position pointer is updated to point to the next item in the index. In step 178, the index detriment count (IDC) 94 (FIG. 2) is updated as follows: IDC=IDC+total number of items in the index. In an alternate embodiment, the current detriment count is set equal to the total number of items in the index, and the IDC is incremented by the current detriment count. In step 180, the flowchart exits.

Figure 7:
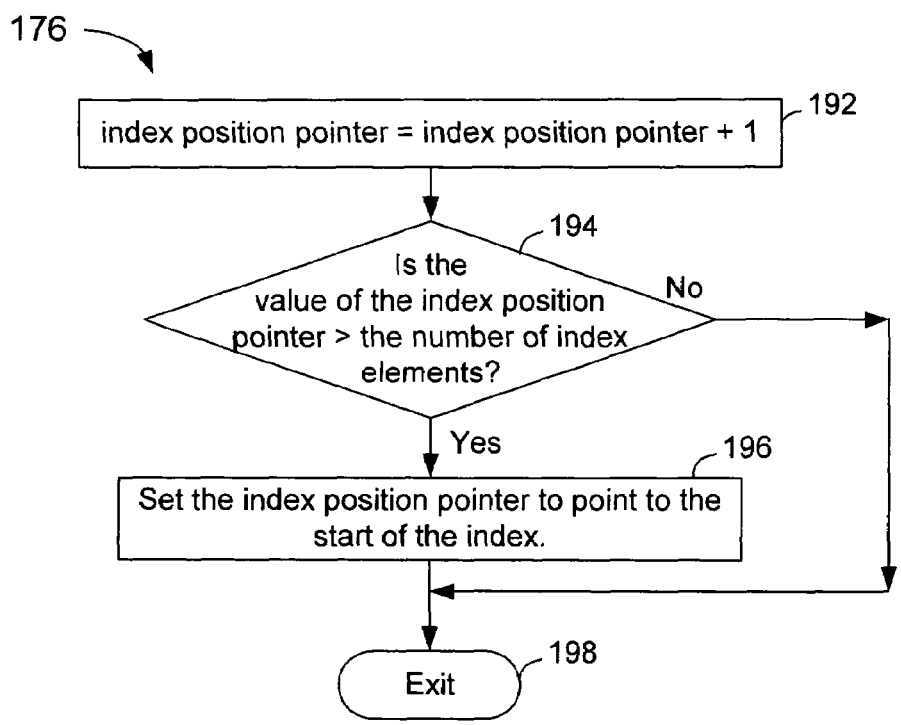
FIG. 7 depicts a flowchart of the step of updating the index position pointer of FIG. 6B.

FIG. 7 depicts a flowchart of step 176 of FIG. 6B which updates the index position pointer. In step 192, the index position pointer is incremented by one to point to the next index position. Step 194 determines whether the value of the index position pointer is greater than the number of index elements in the index. In response to step 194 determining that the value of the index position pointer is greater than the size of the index, in step 196, the index position pointer is set to point to the start of the index. In other words, the value of the index position pointer is set equal to one. In step 198, the flowchart exits. In response to step 194 determining that the value of the index position pointer is not greater than the number of index element in the index, step 194 proceeds to step 198.

In various embodiments, the index size is associated with the index size percentage 87 (FIG. 2) such that the number of index elements is equal to the number of list elements multiplied by the index size percentage. In some embodiments, space for the index is allocated in index blocks, and the index size percentage corresponds to the number of index blocks. For example, in some embodiments, an index size percentage of one percent corresponds to one index block which corresponds to one percent of the size of the list, and more generally, the index size percentage of n percent corresponds to n index blocks.

In some embodiments, the index size percentage has an upper bound, and therefore the index size has an upper size limit or boundary. In various embodiments, the upper bound is equal to twenty-five percent; therefore, the number of index elements is limited to twenty-five percent of the number of list elements. There are several reasons for having the predefined upper bound for the index:

(1) In various embodiments, for the environment that the index is designed for, the performance of the index may improve at substantially lower percentages.

(2) In some embodiments, the index reaches a point of diminishing returns at approximately forty percent of the size of the list because the index is searched sequentially and incurs overhead to maintain.

(3) In various embodiments, the index is allocated from the same storage area as the sequential list. Even though index elements are smaller than list elements, there is still a trade-off between storage consumption and CPU utilization.

(4) In some embodiments, when the index size percentage is limited to twenty-five percent, the maximum additional search length is twenty-five percent of the total number of list elements, plus a few percentage points for the maintenance of the index.

The upper bound is not meant to be limited to twenty-five percent. In other embodiments, other values for the upper bound may be used.

In response to the expiration of the index responsiveness timer, the performance improvement indicator (PII) is calculated and the index size percentage, and therefore the index size, is changed. The index is designed such that very little overhead is incurred in index size changes. At the end of the IRT interval, the accumulated index detriment count is subtracted from the accumulated index improvement count to yield the performance improvement indicator. The performance improvement indicator may be a positive or a negative number.

The index size is changed based on the performance improvement indicator as follows. In response to the IRT expiration, the performance improvement indicator is calculated. If the performance improvement indicator is positive and greater than or equal to the previous interval's performance improvement indicator, the index has reduced the number of elements which are searched which reduces the search time, and the index size percentage is incremented by a predetermined expansion percentage, unless the index size percentage is already at the upper bound. In some embodiments, the expansion percentage is one percent. However, the expansion percentage is not meant to be limited to one percent, and in other embodiments, other values may be used. In addition, the index size percentage is not increased beyond the upper bound.

When the performance improvement indicator is positive or zero, and less-than the previous interval's performance improvement indicator, the index at its current index size has not reduced the number of elements which are searched as much as the index at the previous index size. Therefore, the index size percentage is decremented by a predetermined compression percentage, unless the index is already at a lower bound. In various embodiments the compression percentage is equal to one percent. However, the compression percentage is not meant to be limited to one percent, and in other embodiments, other values may be used. In addition, the index size percentage is not reduced below a lower bound, and therefore the index size has a lower size or boundary. In some embodiments, the lower bound is equal to one percent. However, the lower bound is not meant to be limited to one percent and other values may be used.

In various embodiments, the net effect is that the index size changes in accordance with the determined performance improvement indicator and the previously determined performance improvement indicator in response to each IRT expiration and the index size tends to oscillate, except when the upper and lower bounds would be exceeded. Under certain conditions, to force the index size percentage and the index size to oscillate at the boundaries, prior to storing the previous performance improvement indicator in preparation for the next IRT expiration, the previous performance improvement indicator is set to a predetermined value so that the index size will always change on the next IRT cycle. Under some conditions, the previous performance improvement indicator is set to a value referred to as "high-value" after the index size percentage reaches the upper bound. "High-value" is a positive value that the performance improvement indicator will not reach. In some embodiments, "high-value" is the maximum positive integer value that can be represented in thirty-one bits. However, the "high-value" is not meant to be limited to the maximum positive thirty-one bit value and other values may be used. Under other conditions, the previous performance improvement indicator is set to a value referred to as "low-value" after the index size percentage reaches the lower bound. In various embodiments, "low-value" is equal to a negative value which the performance improvement indicator would not reach. For example, in some embodiments, "low-value" is set equal to the most negative integer value that can be represented in thirty-one bits. However, "low-value" is not meant to be limited to the most negative integer value that can be represented in thirty-one bits and other negative values may be used. In various embodiments, at the lower and upper bounds of the index size percentage, one percent and twenty-five percent, the lower and upper bounds are exceeded at zero percent and twenty-six percent, respectively. In some embodiments, when the state of the sequential list is relatively static, that is, no new terminals are added to the sequential list, the index size percentage tends to oscillate by one percent. In this way, the index size percentage, and therefore the index size, is kept in flux so that the index stays environmentally sensitive. In various embodiments, when the index size percentage, and therefore the index size, is increased, the index position pointer is not changed.

When the performance improvement indicator is negative, the effect of the index is to elongate searches. Therefore the index size percentage is decremented by the predetermined compression percentage, unless the index size percentage is already equal to the lower bound. In addition, the index size percentage is not decremented below the lower bound. Thus, the index size also has a lower size boundary. In various embodiments, the index size percentage is never equal to zero because that would eliminate the index. Thus, in various embodiments, an index size percentage corresponding to the lower bound is advantageous, even if only as an incremental step towards an improved index size percentage, and an improved index size. Until that time, elongating searches by an amount of time associated with the index size expansion percentage, for example, of one percent, is negligibly detrimental. When the index size percentage is decreased by the index compression percentage, the index size is reduced and the index position pointer is reset to the start of the index. The index position pointer is reset to the start of the index because if the index position pointer were not moved, the index position pointer may reference an index element which is no longer part of the index. In addition, setting the index position pointer to the start of the index places the next circular index element replacement in an advantageous position relative to searching the index for that item the next time.

Figure 8A:
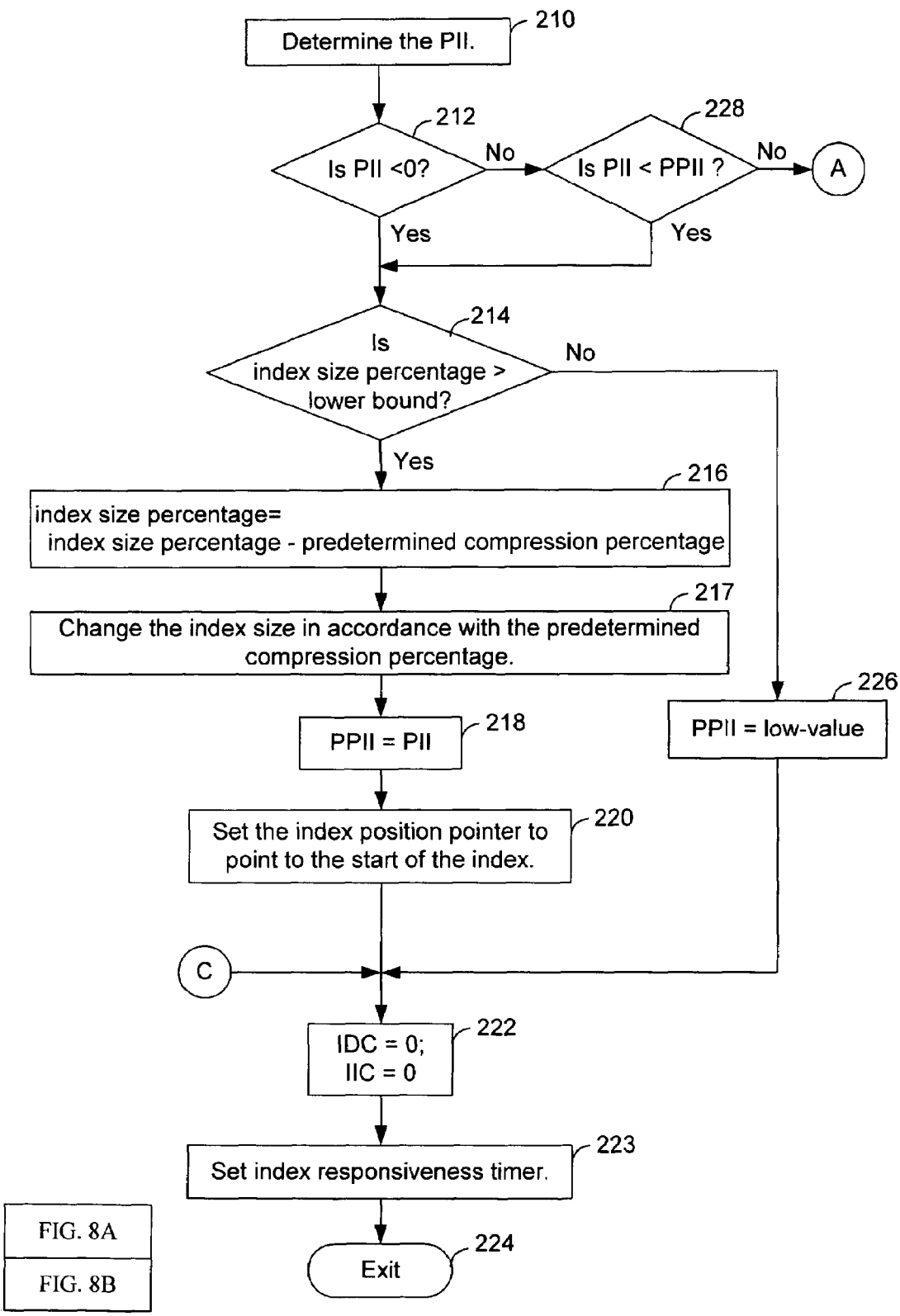
FIG. 8 comprises FIGS. 8A and 8B which collectively depict a flowchart of an embodiment of a technique to change the index size.
Figure 8B:
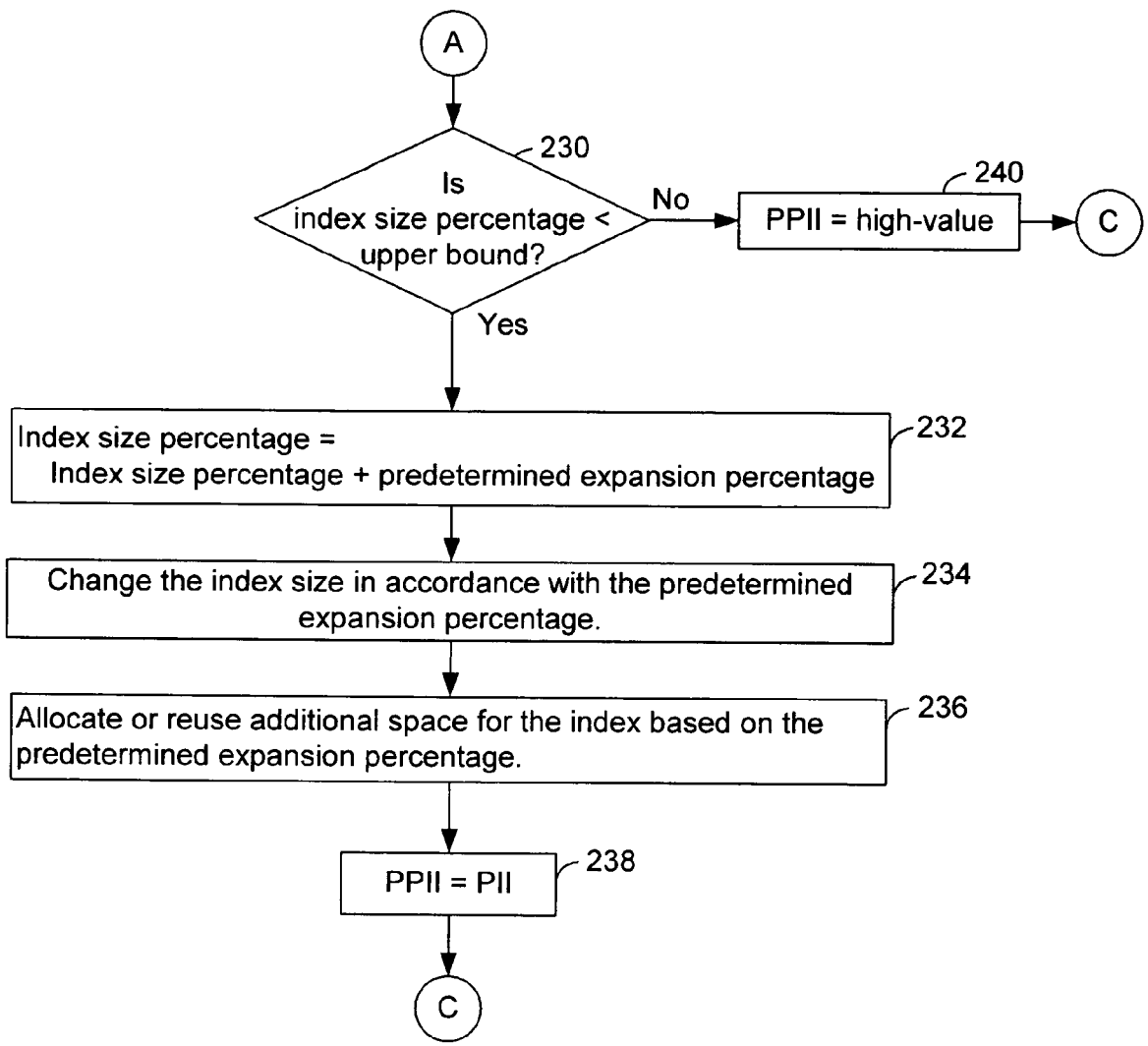

FIG. 8 comprises FIGS. 8A and 8B which collectively depict a flowchart of an embodiment of a technique to change the index size. The changing of the index size of the flowchart of FIG. 8 is performed in response to the expiration of the index responsiveness timer. In various embodiments, the flowchart of FIG. 8 is implemented in the update index size module 76 of FIG. 2. The flowchart of FIG. 8 changes the size of the index in response to the environment. The performance improvement indicator is determined and the size of the index is changed based on the performance improvement indicator.

In step 210, the value of the performance improvement indicator (PII) is determined. The PII is set equal to the value of the index improvement count (IIC) minus the value of the index detriment count (IDC). Step 212 determines whether the value of the performance improvement indicator (PII) is less than zero. If so, step 214 determines whether the index size percentage is greater than the lower bound. In various embodiments, the lower bound is predetermined. In response to step 214 determining that the index size percentage is greater than the lower bound, in step 216, the index size percentage is set equal to the index size percentage minus the predetermined compression percentage. In other words, the index size percentage is reduced by the predetermined compression percentage. In some embodiments, the predetermined compression percentage is equal to one percent which corresponds to one index block. However, the predetermined compression percentage is not meant to be limited to one percent and other values may be used.

In step 217, the index size is changed in accordance with the predetermined compression percentage. For example, when a compression percentage which is equal to one percent corresponds to one index block, the index size is reduced by one index block. Typically, space is not de-allocated when the index size is reduced. In the index, index blocks are no longer used in proportion to the compression percentage. Alternately, in some embodiments, space is de-allocated from the index in accordance with the compression percentage. Alternately, a predetermined number of index blocks correspond to a compression percentage of one percent.

In step 218, the previous performance improvement indicator (PPII) is set equal to the current performance improvement indicator (PII). In step 220, the index position pointer is set to point to the start of the index. In step 222, the index detriment count (IDC) is set equal to zero, and the index improvement count (IIC) is set equal to zero. In step 223, the index responsiveness timer is set to begin another IRT interval. In step 224, the flowchart exits.

In response to step 214 determining that the index size percentage is not greater than the lower bound, in step 226, the previous performance improvement indicator (PPII) is set equal to the predetermined value called "low-value". Setting the previous performance improvement indicator to "low-value" forces the index size percentage, and therefore, the index size, to change at the next interval.

In response to step 212 determining that the PII is not less than zero, step 228 determines whether the performance improvement indicator (PII) is less than the previous performance improvement indicator (PPII). If so, step 228 proceeds to step 214.

In response to step 228 determining that the PII is not less than the PPII, step 228 proceeds via Continuator A to step 230 of FIG. 8B. Step 230 determines whether the index size percentage is less than the upper bound. If so, in step 232, the index size percentage is set equal to the index size percentage plus a predetermined expansion percentage. In other words, the index size percentage is increased by the index expansion percentage. In some embodiments, the predetermined expansion percentage is equal to one percent; however, the expansion percentage is not meant to be limited to one percent and other values may be used.

In step 234, the index size is increased in accordance with the predetermined expansion percentage. For example, in some embodiments, when the index expansion percentage is equal to one percent and one percent corresponds to one index block, the index size is increased by one index block.

In step 236, additional space is allocated or reused for the index based on the predetermined expansion percentage. In various embodiments, as index blocks are allocated or reused, those additional index blocks are allocated or reused in proportion to the index expansion percentage. For example, if the index expansion percentage is equal to one percent and one percent corresponds to one index block, one new block of index items is allocated or reused. In this way the index size in increased. In step 238, the PPII is set equal to the PII, and step 238 proceeds via Continuator C to step 222 of FIG. 8A.

In response to step 230 determining that the index size percentage is not less than the upper bound, in step 240, the PPII is set equal to "high-values". Setting the PPII to "high-values" forces the index size percentage, and therefore, the index size, to change at the next IRT interval. Step 240 proceeds via Continuator C to step 222 of FIG. 8A.

In various embodiments, the index size is increased only during this process shown in the flowchart of FIG. 8, and the index size is not increased when items are added to the sequential list. Thus the index can be allocated in blocks of index elements, which substantially simplifies the technique.

Although the performance improvement indicator is determined in the flowchart of FIG. 8, in an alternate embodiment, the performance improvement indicator is determined in the flowchart of FIG. 6 during the monitoring of the accesses to the index and list. For example, the performance improvement indicator (PII) may be determined prior to the exit steps of FIGS. 6A and 6B as follows: PII=IIC−IDC.

In another embodiment, the performance improvement indicator is determined directly rather than the index improvement count and the index detriment count. For example, in step 162 of FIG. 6A, the PII is determined as follows: PII=PII+list position−index position; in step 168 of FIG. 6A, the PII is determined as follows: PII=PII+index position-list position; and, in step 178 of FIG. 6B, the PII is determined as follows: PII=PII+total number of items in the index.

In yet another embodiment, the performance improvement indicator is determined based on the access time. The value of the CPU clock is stored prior to accessing a sequential list item to provide a start time and then again after accessing the sequential list item to provide an end time. A measured time is determined by subtracting the start time from the end time. The measured time is accumulated in the performance improvement indicator during the IRT interval. After the expiration of the IRT interval, when the performance improvement indicator is greater than the previous performance improvement indicator, the index size is increased by an amount corresponding to the predetermined expansion percentage. When the performance improvement indicator is less than the previous performance improvement indicator, the index size is decreased by an amount corresponding to the predetermined compression percentage. As described above, at predefined boundaries, the index size is forced to oscillate.

Due to index compression and expansion it is possible that a duplicate index entry may exist for an item in the sequential list. This is not a problem. Because the index position pointer is set to the beginning of the index on compression, a duplicate item may be added to the index relative to the entire index space, both in-use and not-in-use. Upon future expansion, the duplicated item will be found earlier in the sequential search of the index. If the index stays expanded, the index position pointer eventually results in the duplicate index item being replaced.

Figure 9:
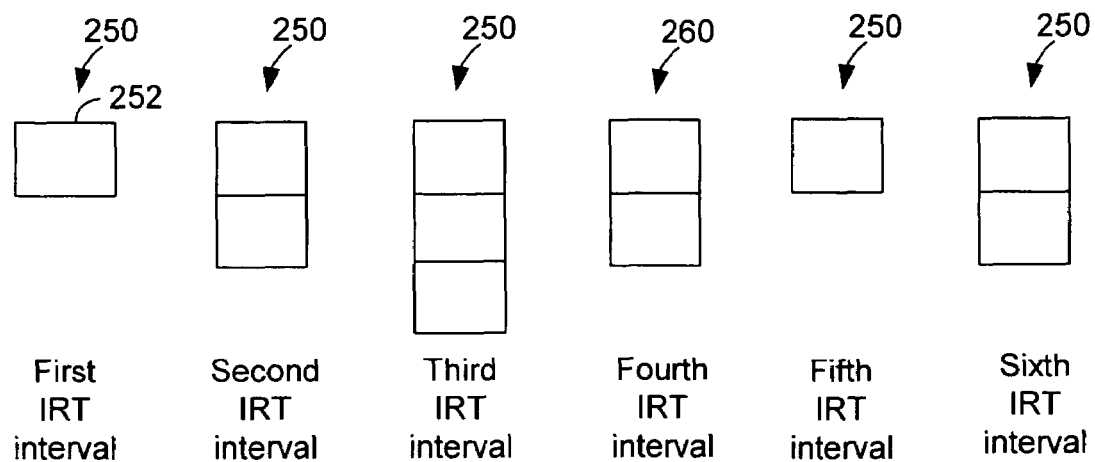
FIG. 9 depicts a diagram illustrating the changing of the index size in a series of consecutive time intervals for an exemplary index.

FIG. 9 depicts a diagram illustrating the changing of the index size in a series of consecutive IRT intervals for an exemplary index 250. In the first IRT interval, the index 250 has one index block 252. After the first IRT interval expired, the size of the index 250 increased to two index blocks for the second IRT interval. After the second IRT interval expired, the size of the index 250 increased to three index blocks for the third IRT interval. After the expiration of the third IRT interval, the size of the index size 250 decreased to two index blocks for the fourth IRT interval. After the expiration of the fourth IRT interval, the size of the index 250 decreased to one index block, the minimum size, for the fifth IRT interval. After the expiration of the fifth IRT interval, the size of the index 250 increased to two index blocks for the sixth time IRT interval.

Figure 10:
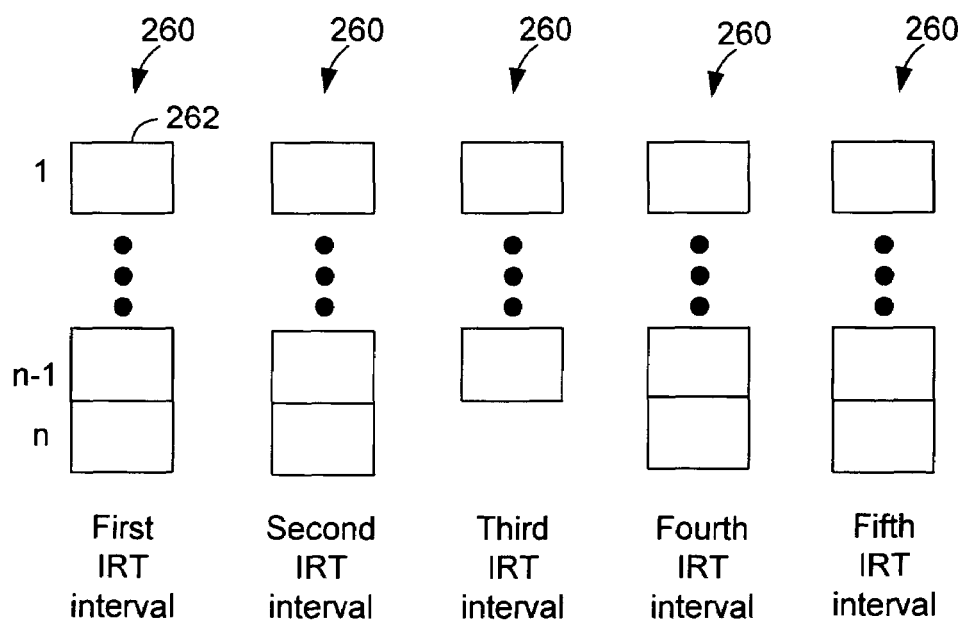
FIG. 10 depicts a diagram illustrating the oscillation of the index size in a series of consecutive time intervals for another exemplary index.

FIG. 10 depicts a diagram illustrating the oscillation of the index size in a series of consecutive IRT intervals for another exemplary index 260 when the index 260 has reached the upper bound at a first IRT interval. The index 260 has n index blocks 262 and has reached the upper size limit. The index blocks are numbered to the left of the index. After the expiration of the first IRT interval, because the size of the index has reached the upper limit, the previous performance improvement indicator is set to "high-value" and the size of the index 260 is unchanged. Thus the size of the index 260 is unchanged for the second IRT interval. After the expiration of the second IRT interval, "high-value" forces the size of the index 260 to be decreased by one index block for the third IRT interval. After the expiration of the third IRT interval, the size of the index 260 is increased by one index block for the fourth IRT interval. After the expiration of the fourth IRT interval, because the size of the index has reached the upper limit, the previous performance improvement indicator is set to "high-value" and the size of the index 260 is unchanged for the fifth IRT interval.

Illustratively, various embodiments of the present invention can be used to monitor and compute the average destination queue time (DQT) for messages sent to an IBM IMS Terminal Destination. IMS Terminals are also referred to as Communication Name Tables (CNTs). There may be many thousands of different CNT Names in an IBM IMS subsystem installation.

In some embodiments, during the life of the performance manager application's execution, there may be many thousands of messages sent to a given CNT. The length of time that a message spends queued to a CNT is the amount of time that IBM IMS is waiting to deliver that message to its destination, for example, an ATM machine. Therefore, to improve IMS performance, the average destination queue time for each CNT can be calculated and reduced. Message delivery to CNTs is potentially very high in volume and references to those CNTs may vary greatly, both in frequency of reference and recentness of reference. The subset of active CNTs has a tendency to be small relative to the set of all CNTs and has a tendency to change with business conditions over the course of a day.

To calculate the destination queue time for a single message sent to a given CNT, the performance manager application receives two log records from the IMS, usually within very close time proximity of one another: a) The message's enqueue log record (ELR) indicating that the message is ready for delivery by IMS to its destination; b) The message's dequeue log record (DLR) indicating that the message has been delivered by IBM IMS to its destination.

The ELR and DLR contain the CNT Name and the time of day. The message's destination queue time is equal to the DLR's time of day minus the ELR's time of day; that is, the time the message spent on the destination queue awaiting delivery to, for example, an automatic teller machine (ATM).

As unique CNT names are encountered by the performance manager application in IMS log records, those unique CNT names are added to a sequential list so that each CNT can be monitored. Each time that an ELR/DLR pair for a CNT arrives in the performance manager application, the CNT is located in the list, the DQT is calculated and accumulated in the total destination queue time for the CNT, and the CNT message count is incremented by one. The average destination queue time for a CNT is equal to the total destination queue time divided by the message count.

For example, assume that two messages were delivered to CNT 'ATM01'. The first message spent 1000 milliseconds (time between the DLR and ELR) on the ATM01 queue prior to delivery. The second message spent 3000 milliseconds on the ATM01 queue prior to delivery. The average destination queue time for ATM01 is thus 2000 milliseconds (2 seconds). Assume also that two messages were delivered to CNT "ATM02". The first message spent 50,000 milliseconds (time between the DLR and ELR) on the ATM02 queue, the second message spent 100,000 milliseconds on the ATM02 queue. The average destination queue time for ATM02 is 75,000 milliseconds (75 seconds). The banking customers at ATM01 are receiving, on average, their cash withdrawals 73 seconds faster than the customers at AMT02. Assuming that only these four messages have been delivered since the performance manager application was started, there are only two CNTs in the list. Note that each time the DQT Total and message count for a CNT is updated, the CNT is located in the list. As the list length grows to thousands of CNTs, without the use of the EROCA index, access time to the CNTs becomes very long. Because the performance manager application executes on the same processor as IMS, any use of the processor by the performance manager application to locate CNTs takes away from the processor resources available to IMS. Therefore, in this example, the performance manager application makes efficient use of the processor by reducing the amount of time to locate a CNT in the list.

In various embodiments, the EROCA index to the CNT's and the sequential list of CNTs and their DQT data are both stored in a predefined z/OS Data Space, which will be referred to as the list space. The list space is owned by the performance manager application address space and is maintained for the life of a performance manager application execution. In this example, CNT Names are never removed from the list space; therefore, the length of the sequential list increases continually. Users set the size of the list space such that all CNTs will fit into the list; otherwise, the DQT for a CNT will not be available. Space for the EROCA index is allocated from the data space as a percentage of the number of CNT items in the list.

In some embodiments, CNT names vary widely across IMS installations, yet have a tendency to be very similar within a single installation; therefore, searching via hashing or sorting is inefficient when compared to the EROCA index.

In various embodiments, using the EROCA index, CNT reference patterns result in the most-recently-referenced and most-frequently-used CNTs having affinity to the index. In the case of a single message to a specific CNT, there is a very close time of day proximity of the ELR and DLR relative to other messages to other CNTs in the list. Therefore, in these embodiments, if a relatively short index of the CNT Names and storage addresses of the only most-recently-referenced CNTs is kept, the index can be searched to determine the address of the CNT item.

For example, assume that it is known that no more than ten percent of an IMS system's CNTs have messages queued to them at any one instant in time. In practice, in this exemplary application, ten percent is typically much greater than would occur. This means that after a CNT is initially placed in the index, a search of the index of the most-recently-referenced ten percent of the CNTs would always contain the address of any CNT item referenced in an arriving ELR/DLR. For example, assume that the average reference is to a CNT item in the middle of the list and the average reference is to a CNT item in the middle of the index, the savings approaches a factor of ten; that is, searching fifty percent of the ten percent index (five percent of the entire list) yields the address of the CNT data that would otherwise require searching fifty percent of the entire list. A five percent search is one-tenth of a fifty percent search; however on the first reference, the CNT would not be in the index, so it is only on the second reference that the savings begins to approach this factor of ten, excluding the overhead of maintaining such an index.

CNT reference patterns typically vary widely among IMS installations and vary widely within the same IMS over time. Further, the percentage of CNTs that have messages queued to them varies over the course of a business day; therefore, if the size of the index is correspondingly adjusted, the length of an index search can be reduced. For example, if the percentage of CNTs that are active is one percent of the size of the list for a prolonged period, and the size of the index was decreased to one percent, then the search of the index would be reduced by a factor of ten. For example, if the index size were reduced to ten from one hundred index elements, the average search length approaches five instead of fifty index elements when the number of active CNTs decreases from ten percent to one percent.

In various embodiments, the index responsiveness timer is typically set to expire at a first predetermined interval, for example, approximately every two minutes. Typically, this time limit is sufficiently responsive for most business conditions without imposing undue overhead in testing the conditions. However, the IRT interval is not meant to be limited to a duration of two minutes and other durations for the IRT interval may be used. For example, if a system is very static relative to references to items, then the IRT interval could be extended to further reduce its already conservative overhead. In some embodiments, if it is determined that the index size percentage, and therefore, the index size, is relatively static, that is, has low volatility, over a predetermined number of intervals, the IRT interval is set to expire at longer intervals. If it is determined that the volatility increases, which indicates that the system is becoming busier, then the IRT interval is re-set to expire at shorter intervals to increase the responsiveness of the EROCA index. For example, if the maximum and minimum values of the index size percentage are tracked over a predetermined number of consecutive intervals and if the difference between the maximum and minimum values is within a predetermined difference limit, for example, three percent, that would indicate a low volatility and the IRT interval is extended. In another example, if the difference between the maximum and minimum values of the index size percentage is less than or equal to a predefined limit for five IRT cycles, the index responsiveness timer could be set to expire at a second predetermined interval, for example, approximately every five minutes. When the index size percentage becomes more volatile, the index responsiveness timer could be set back to the first predetermined interval. In various embodiments, the IRT interval may be adjusted after the index size has been changed and before a new IRT interval begins, for example, between steps 222 and 223 of FIG. 8A. In other embodiments, the index size is tracked rather than the index size percentage.

Other embodiments of the technique to change the size of the index will now be described. In these techniques, the size of the index is adjusted based on at least one performance indicator and the previous change of the index size. In these techniques, step 138 of the flowchart of FIG. 5 is modified to also initialize a previous change flag, for example, the previous change flag is set to "decrease." Alternately, the previous change flag is set to "increase."

Figure 11A:
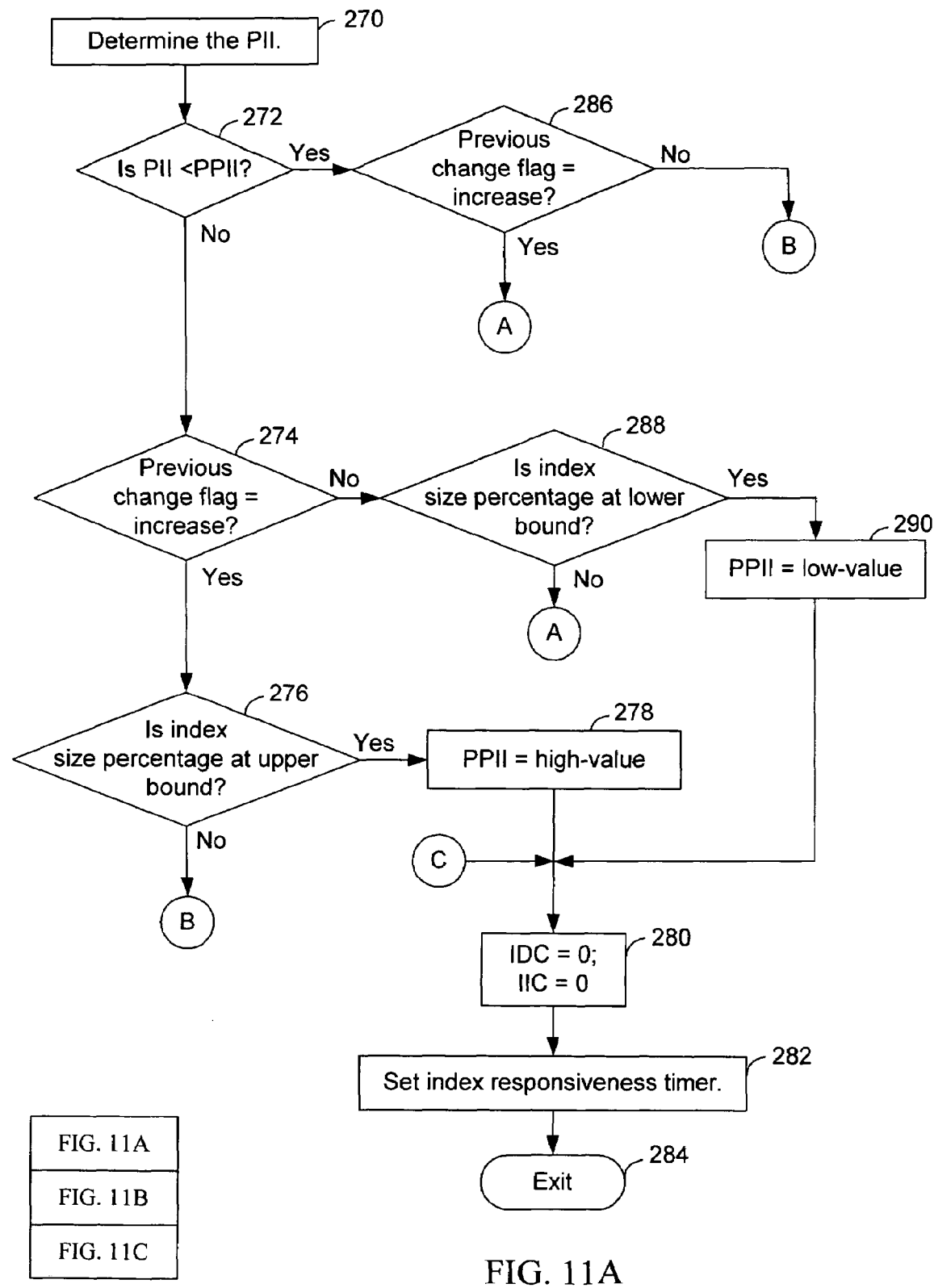
FIG. 11 comprises FIGS. 11A, 11B and 11C which collectively depict a flowchart of an embodiment of another technique to change the index size.
Figure 11B:
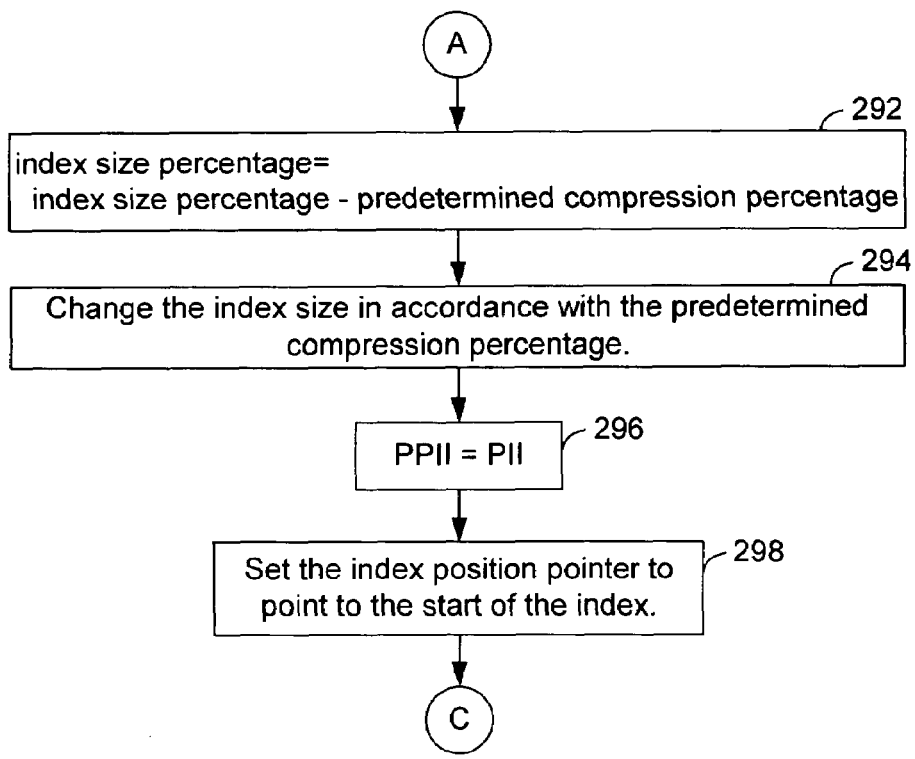
Figure 11C:
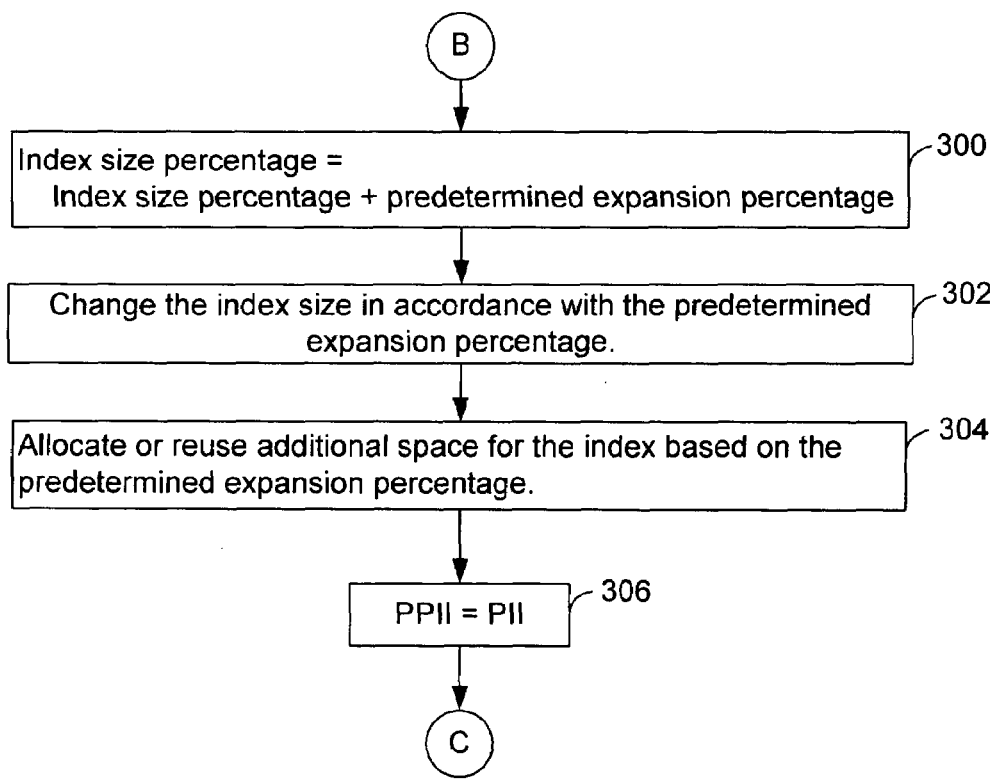

FIG. 11 comprises FIGS. 11A, 11B and 11C which collectively depict a flowchart of an embodiment of another technique to change the index size. The changing of the index size of the flowchart of FIG. 11 is performed in response to the expiration of the index responsiveness timer. In various embodiments, the flowchart of FIG. 11 is implemented in the update index size module 76 of FIG. 2.

In step 270, the performance improvement indicator is determined. The performance improvement indicator is determined as described above with respect to step 210 of FIG. 8A.

Step 272 determines whether the performance improvement indicator (PII) is less than the previous performance improvement indicator (PPII). In response to step 272 determining that the performance improvement indicator is not less than the previous performance improvement indicator, step 274 determines whether a previous change flag is set to "increase." In response to step 274 determining that the previous change flag is set to "increase," step 276 determines whether the index size percentage is at the upper bound. In response to step 276 determining that the index size percentage is at the upper bound, in step 278, the previous performance improvement indicator is set to "high-value." In step 280, the index detriment count (IDC) is set equal to zero, and the index improvement count (IIC) is set equal to zero. In step 282, the index responsiveness timer is set. In step 284, the flowchart exits.

In response to step 272 determining that the performance improvement indicator is less than the previous performance improvement indicator, step 286 determines whether the previous change flag is set to increase. In response to step 276 determining that the previous change flag is set to increase, step 276 proceeds via Continuator A to step 292 of FIG. 11B to decrease the index size. In response to step 276 determining that the previous change flag is not set to increase, step 276 proceeds via Continuator B to step 300 of FIG. 11C to increase the index size.

In response to step 274 determining that the previous change flag is not set to increase, step 288 determines whether the index size percentage is at a lower bound. In response to step 288 determining that the index size percentage is at a lower bound, in step 290, the previous performance improvement indicator is set to "low-value" and step 290 proceeds to step 280.

In response to step 288 determining that the index size percentage is not at a lower bound, step 288 proceeds via Continuator A to step 292 of FIG. 11B to decrease the index size.

In FIG. 11B in step 292, the index size percentage is decremented by a predetermined compression percentage. In step 294, the index size is changed in accordance with the predetermined compression percentage. In step 296, the previous performance improvement indicator is set equal to the performance improvement indicator. In step 298, the index position pointer is set to point to the start of the index, and step 298 proceeds via Continuator C to step 280 of FIG. 11A.

In FIG. 11C in step 300, the index size percentage is incremented by a predetermined expansion percentage. In step 302, the index size is changed in accordance with the predetermined expansion percentage. In step 304, additional space for the index is allocated or reused based on the predetermined expansion percentage. In step 306, the previous performance improvement indicator is set equal to the performance improvement indicator.

Figure 12:
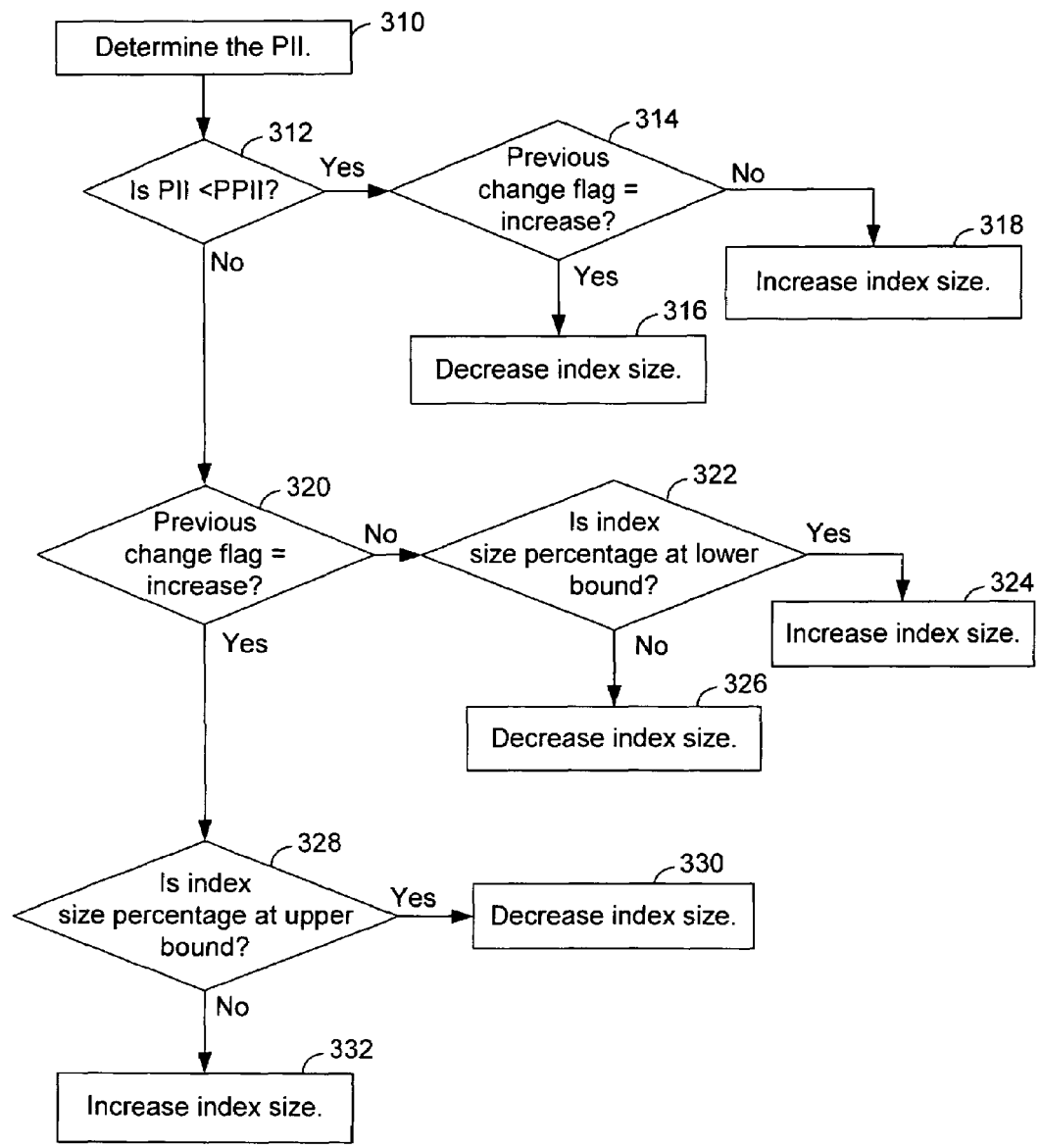
FIG. 12 depicts a flowchart of an embodiment of yet another technique to change the index size.

FIG. 12 depicts a flowchart of an embodiment of yet another technique to change the index size. The changing of the index size of the flowchart of FIG. 12 is performed in response to the expiration of the index responsiveness timer. In various embodiments, the flowchart of FIG. 12 is implemented in the update index size module 76 of FIG. 2.

In step 310, the performance improvement indicator is determined. The performance improvement indicator is determined as described above with respect to step 210 of FIG. 8A.

Step 312 determines whether the performance improvement indicator (PII) is less than the previous performance improvement indicator (PPII). In response to step 312 determining that the performance improvement indicator is less than the previous performance improvement indicator, step 314 determines whether a previous change flag is set to "increase." In response to step 314 determining that the previous change flag is set to "increase," in step 316, the index size is decreased. In response to step 314 determining that the previous change flag is set to "decrease," in step 318, the index size is increased.

In response to step 312 determining that the performance improvement indicator is not less than the previous performance improvement indicator, step 320 determines whether a previous change flag is set to "increase." In response to step 320 determining that the previous change flag is not set to "increase," step 322 determines whether the index size is at a lower bound. In response to step 322 determining that the index size is at the lower bound, in step 324, the index size is increased. In response to step 322 determining that the index size is not at the lower bound, in step 326, the index size is decreased.

In response to step 320 determining that the previous change flag is set to "increase," step 328 determines whether the index size is at an upper bound. In response to step 328 determining that the index size is at the upper bound, in step 330, the index size is increased. In response to step 328 determining that the index size is not at the upper bound, in step 332, the index size is decreased.

Figure 13:
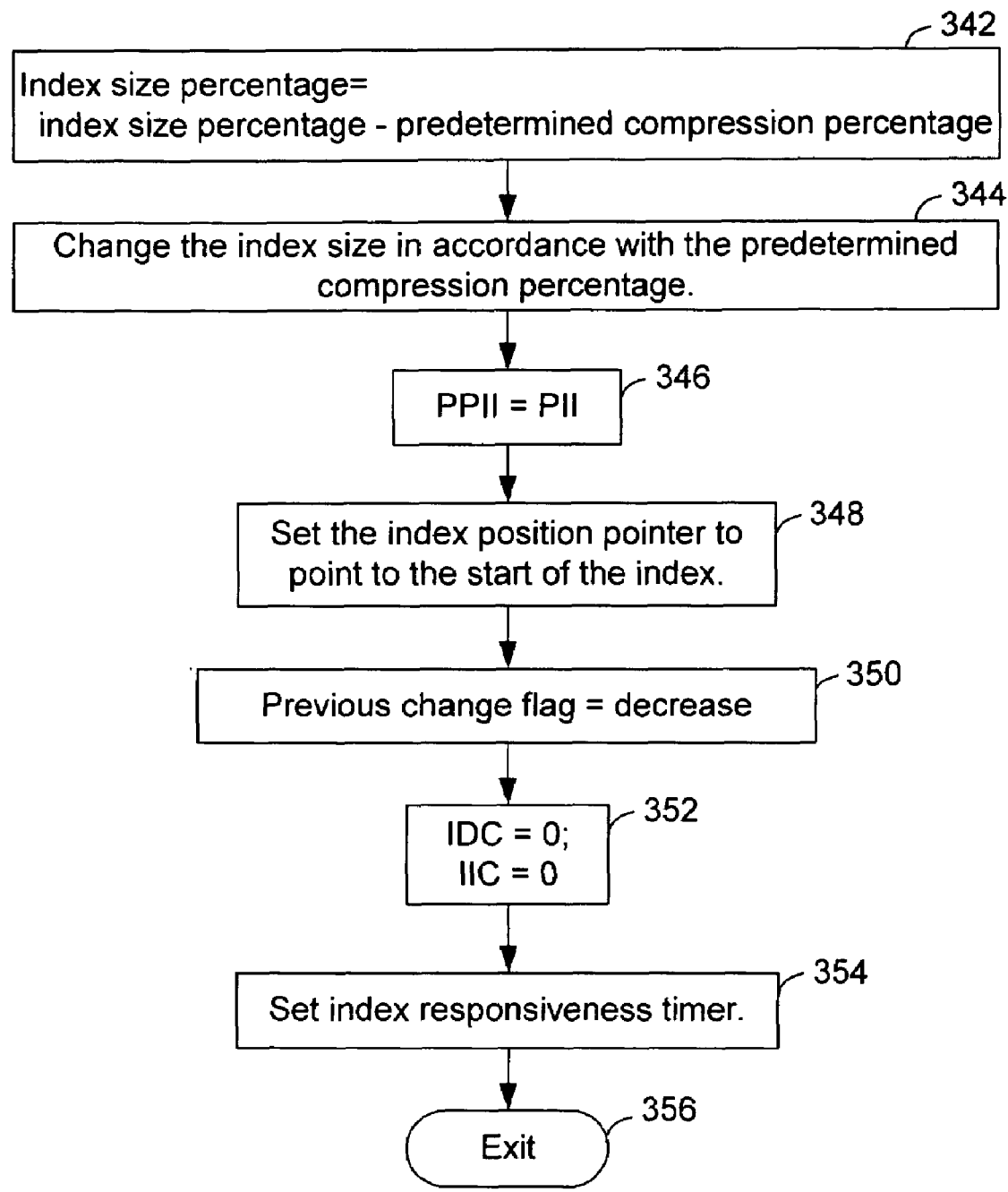
FIG. 13 depicts a flowchart of an embodiment of the steps of decreasing the index size of FIG. 12.

FIG. 13 depicts a flowchart of an embodiment of the steps to decrease the index size of FIG. 12. In step 342, the index size percentage is decreased by the predetermined compression percentage. In step 344, the index size is changed in accordance with the predetermined compression percentage. In step 346, the previous performance improvement indicator is set equal to the performance improvement indicator. In step 348, the index position pointer is set to point to the start of the index. In step 350, the previous change flag is set to "decrease." In step 352, the index detriment count (IDC) and the index improvement count (IIC) are set equal to zero. In step 354, the index responsiveness timer is set. In step 356, the flowchart exits.

Figure 14:
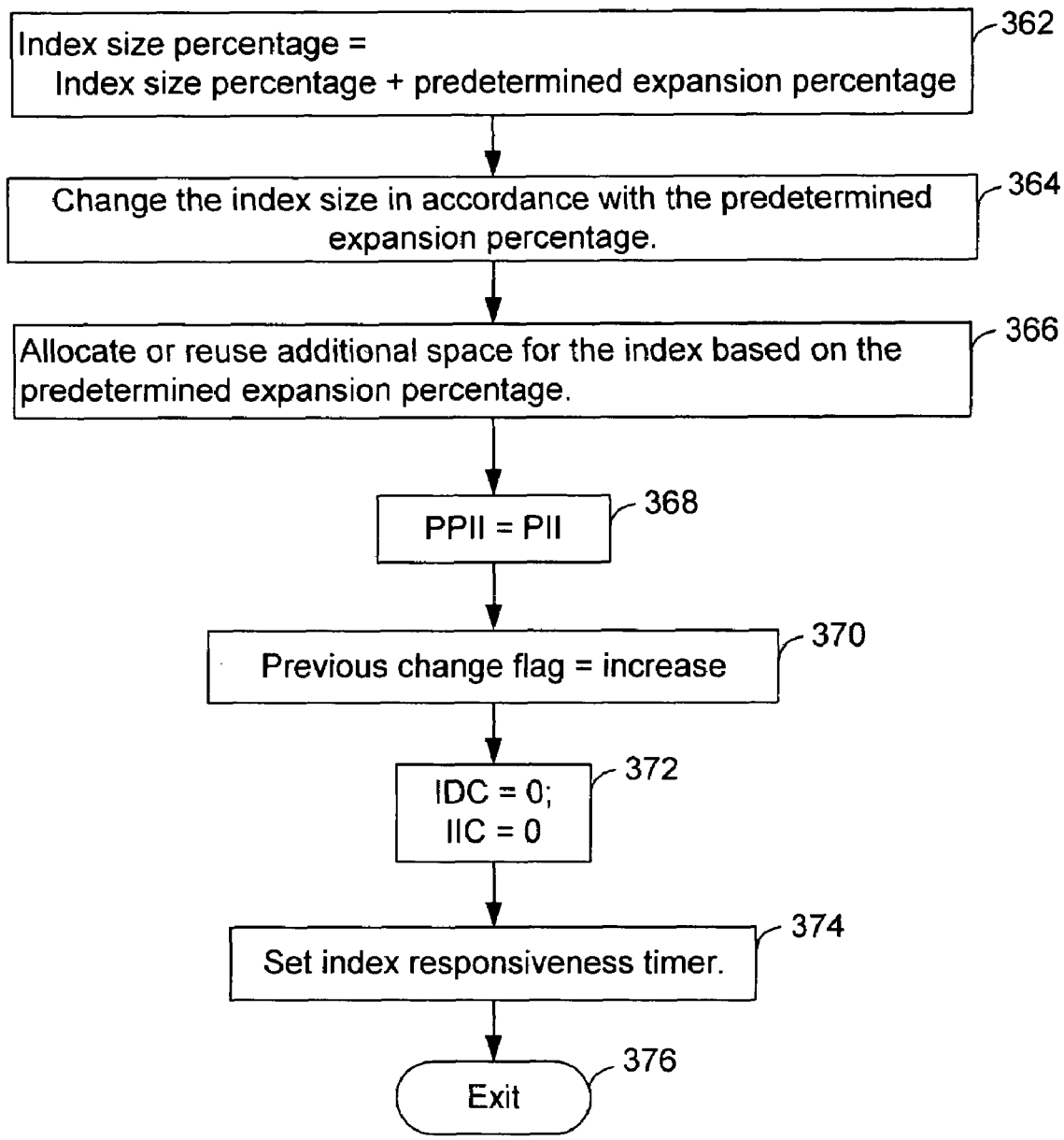
FIG. 14 depicts a flowchart of an embodiment of the steps of increasing the index size of FIG. 12.

FIG. 14 depicts a flowchart of an embodiment of the steps to increase the index size of FIG. 12. In step 362, the index size percentage is increased by the predetermined expansion percentage. In step 364, the index size is changed in accordance with the predetermined expansion percentage. In step 366, additional space for the index is allocated or reused based on the predetermined expansion percentage. In step 368, the previous performance improvement indicator is set equal to the performance improvement indicator. In step 370, the previous change flag is set to "increase." In step 372, the index detriment count (IDC) and the index improvement count (IIC) are set equal to zero. In step 374, the index responsiveness timer is set. In step 376, the flowchart exits.

In yet another alternate embodiment, the use of the index may be discontinued under certain circumstances. When the performance improvement indicator is negative for a predetermined number of consecutive IRT intervals, the use of the index may be discontinued for a predefined number of IRT intervals.

Various embodiments of the present invention have been described with respect to a performance improvement indicator. In an alternate embodiment, a performance detriment indicator is used rather than a performance improvement indicator. The performance detriment indicator is equal to the IDC minus the IIC.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of managing a circular index, comprising:
providing a sequential list comprising a plurality of list elements, each list element comprising an item and item data, thereby providing a plurality of items and associated item data;
providing said circular index, said circular index comprising index elements, each index element comprising one item of said plurality of items and a list position of said one item in said plurality of list elements, said circular index having a circular index size;
receiving a plurality of requests, each request specifying a requested item of said plurality of items, wherein at least two requests of said plurality of requests specify requested items that are different;
in response to said each request of said plurality of requests:
searching said circular index to find said requested item of said each request in said index elements of said circular index;
in response to finding said requested item in said circular index, identifying an index position of said requested item of said each request in said circular index; identifying a list position associated with said requested item of said each request in said circular index; in response to said index position of said requested item being greater than said list position of said requested item, incrementing an index detriment count by a difference between said index position and said list position; in response to said index position of said requested item not being greater than said list position of said requested item, incrementing an index improvement count by a difference between said list position and said index position; and accessing said requested item in said sequential list based on said list position of said requested item;
in response to said requested item not being in said circular index, searching said sequential list to find said requested item, identifying said list position of said requested item, storing said requested item and said list position of said requested item in said circular index, incrementing said index detriment count by a total number of said plurality of items in said circular index, and accessing said requested item in said sequential list based on said list position;
at predetermined intervals, said predetermined intervals having a current interval and a previous interval:
determining, during said current interval, a current value of a performance indicator, wherein said current value of said performance indicator is equal to a difference between said index improvement count and said index detriment count, said performance indicator representing an effect of said circular index on accessing items in said sequential list;
in response to said current value of said performance indicator being less than a previous value of said performance indicator of said previous interval and said index size being increased in said previous interval, decreasing said circular index size;
in response to said current value of said performance indicator being less than said previous value of said performance indicator and said circular index size being decreased in said previous interval, increasing said circular index size;
in response to said current value of said performance indicator not being less than said previous value of said performance indicator and said circular index size being decreased in said previous interval and said circular index size not being at a lower bound, decreasing said circular index size; and
in response to said current value of said performance indicator not being less than said previous value of said performance indicator and said circular index size being increased in said previous interval and said circular index size not being at an upper bound, increasing said circular index size.

2. The method of claim 1 further comprising: in response to said current value of said performance indicator not being less than said previous value of said performance indicator and said circular index size not being increased in said previous interval and said circular index size being at said lower bound, setting said value of said previous performance indicator to a low-value to force said circular index size to increase in a next interval.

3. The method of claim 1 further comprising: in response to said current value of said performance indicator not being less than said previous value of said performance indicator and said circular index size being increased in said previous interval and said circular index size being at said upper bound, setting said value of said previous performance indicator to a high-value to force said circular index size to decrease in a next interval.

4. The method of claim 2 wherein said circular index size oscillates between said lower bound and a next higher size.

5. The method of claim 3 wherein said circular index size oscillates between said upper bound and a next lower size.

6. The method of claim 1 further comprising:
changing a duration of said predetermined interval in response to changes in said circular index size.

7. The method of claim 1 wherein said circular index has a start index position and an end index position, said circular index also being associated with an index position pointer, wherein said storing stores said requested item and said list position in an index element referenced by said index position pointer, and further comprising:
  in response to said index position pointer pointing to said end index position, and in response to said storing said requested item in said circular index, updating said index position pointer to point to said start index position.

8. An article of manufacture comprising a computer usable storage medium embodying one or more instructions executable by a computer for performing a method of managing a circular index, said method comprising:
  providing a sequential list comprising a plurality of list elements, each list element comprising an item and item data, thereby providing a plurality of items and associated item data;
  providing said circular index, said circular index comprising index elements, each index element comprising one item of said plurality of items and a list position of said one item in said plurality of list elements, said circular index having a circular index size;
  receiving a plurality of requests, each request specifying a requested item of said plurality of items, wherein at least two requests of said plurality of requests specify requested items that are different;
  in response to said each request of said plurality of requests:
    searching said circular index to find said requested item of said each request in said index elements of said circular index;
    in response to finding said requested item in said circular index, identifying an index position of said requested item of said each request in said circular index; identifying a list position associated with said requested item of said each request in said circular index; in response to said index position of said requested item being greater than said list position of said requested item, incrementing an index detriment count by a difference between said index position and said list position; in response to said index position of said requested item not being greater than said list position of said requested item, incrementing an index improvement count by a difference between said list position and said index position; and accessing said requested item in said sequential list based on said list position of said requested item;
    in response to said requested item not being in said circular index, searching said sequential list to find said requested item, identifying said list position of said requested item, storing said requested item and said list position of said requested item in said circular index, incrementing said index detriment count by a total number of said plurality of items in said circular index, and accessing said requested item in said sequential list based on said list position;
  at predetermined intervals, said predetermined intervals having a current interval and a previous interval:
    determining, during said current interval, a current value of a performance indicator, wherein said current value of said performance indicator is equal to a difference between said index improvement count and said index detriment count, said performance indicator representing an effect of said circular index on accessing items in said sequential list;
    in response to said current value of said performance indicator being less than a previous value of said performance indicator of said previous interval and said index size being increased in said previous interval, decreasing said circular index size;
    in response to said current value of said performance indicator being less than said previous value of said performance indicator and said circular index size being decreased in said previous interval, increasing said circular index size;
    in response to said current value of said performance indicator not being less than said previous value of said performance indicator and said circular index size being decreased in said previous interval and said circular index size not being at a lower bound, decreasing said circular index size; and
    in response to said current value of said performance indicator not being less than said previous value of said performance indicator and said circular index size being increased in said previous interval and said circular index size not being at an upper bound, increasing said circular index size.

9. The article of manufacture of claim 8, said method further comprising: in response to said current value of said performance indicator not being less than said previous value of said performance indicator and said circular index size not being increased in said previous interval and said circular index size being at said lower bound, setting said value of said previous performance indicator to a low-value to force said circular index size to increase in a next interval.

10. The article of manufacture of claim 8, said method further comprising: in response to said current value of said performance indicator not being less than said previous value of said performance indicator and said circular index size being increased in said previous interval and said circular index size being at said upper bound, setting said value of said previous performance indicator to a high-value to force said circular index size to decrease in a next interval.

11. The article of manufacture of claim 9 wherein said circular index size oscillates between said lower bound and a next higher size.

12. The article of manufacture of claim 10 wherein said circular index size oscillates between said upper bound and a next lower size.

13. The article of manufacture of claim 8 wherein said circular index has a start index position and an end index position, said circular index also being associated with an index position pointer, wherein said storing stores said requested item and said list position in an index element referenced by said index position pointer, said method further comprising:
  in response to said index position pointer pointing to said end index position, and in response to said storing said requested item in said circular index, updating said index position pointer to point to said start index position.

14. An apparatus for managing a circular index, comprising:
  a processor; and
  a memory storing:
    a sequential list comprising a plurality of list elements, each list element comprising an item and item data, thereby providing a plurality of items and associated item data;
    said circular index, said circular index comprising index elements, each index element comprising one item of said plurality of items and a list position of said one item in said plurality of list elements, said
circular index having a circular index size;
said memory also storing instructions that:
receive a plurality of requests, each request specifying
a requested item of said plurality of items, wherein
at least two requests of said plurality of requests
specify requested items that are different;
in response to said each request of said plurality of
requests:
search said circular index to find said requested item
of said each request in said index elements of said
circular index;
in response to finding said requested item in said
circular index, identifying an index position of
said requested item of said each request in said
circular index; identify a list position associated
with said requested item of said each request in
said circular index; in response to said index
position of said requested item being greater than
said list position of said requested item, increment
an index detriment count by a difference between
said index position and said list position; in
response to said index position of said requested
item not being greater than said list position of
said requested item, increment an index improve-
ment count by a difference between said list
position and said index position; and access said
requested item in said sequential list based on said
list position of said requested item;
in response to said requested item not being in said
circular index, search said sequential list to find
said requested item, identify said list position of
said requested item, store said requested item and
said list position of said requested item in said
circular index, increment said index detriment
count by a total number of said plurality of items
in said circular index, and access said requested
item in said sequential list based on said list
position;
at predetermined intervals, said predetermined intervals
having a current interval and a previous interval:
determine, during said current interval, a current value of
a performance indicator, wherein said current value of
said performance indicator is equal to a difference
between said index improvement count and said index
detriment count said at least one performance indicator
representing an effect of said circular index on access-
ing items in said sequential list;
in response to said current value of said performance
indicator being less than a previous value of said
performance indicator of said previous interval and said
index size being increased in said previous interval,
decrease said circular index size;
in response to said current value of said performance
indicator being less than said previous value of said
performance indicator and said circular index size
being decreased in said previous interval,
increase said circular index size;
in response to said current value of said performance
indicator not being less than said previous value of said
performance indicator and said circular index size
being decreased in said previous interval and said
circular index size not being at a lower bound,
decrease said circular index size; and
in response to said current value of said performance
indicator not being less than said previous value of said
performance indicator and said circular index size
being increased in said previous interval and said
circular index size not being at an upper bound,
increase said circular index size.

15. The apparatus of claim 14 wherein said circular index size oscillates between said lower bound and a next size.

16. The method of claim 2 further comprising: setting said index detriment count equal to zero and said index improvement count equal to zero.

17. The method of claim 3 further comprising: setting said index detriment count equal to zero and said index improvement count equal to zero.

18. The method of claim 1 wherein an index position pointer points to an oldest item in said circular index, wherein said storing stores said requested item and said list position in said index element pointed to by said index position pointer,
further comprising: in response to said current value of said performance indicator being less than a previous value of said performance indicator of said previous interval and said circular index size being increased in said previous interval, also setting an index position pointer to tlie a start position of said circular index.

19. The method of claim 1 wherein after said storing stores said requested item and said list position in said index element pointed to by said index position pointer, incrementing said index position pointer wherein in response to said index position pointer pointing to an end of said circular index, said index position pointer is set to point to a start of said circular index.

20. The method of claim 1 wherein said circular index size is increased in accordance with a predetermined expansion percentage.

21. The method of claim 1 wherein said circular index size is decreased in accordance with a predetermined compression percentage.

22. The article of manufacture of claim 9, said method further comprising: setting said index detriment count equal to zero and said index improvement count equal to zero.

23. The article of manufacture of claim 10, said method further comprising: setting said index detriment count equal to zero and said index improvement count equal to zero.

24. The article of manufacture of claim 8 wherein an index position pointer points to an oldest item in said circular index, wherein said storing stores said requested item and said list position in said index element pointed to by said index position pointer,
said method further comprising: in response to said current value of said performance indicator being less than a previous value of said performance indicator of said previous interval and said circular index size being increased in said previous interval, also setting an index position pointer to a start of said circular index.

25. The article of manufacture of claim 8 wherein after said storing stores said requested item and said list position in said index element pointed to by said index position pointer, incrementing said index position pointer wherein in response to said index position pointer pointing to an end of said circular index, setting said index position pointer to point to a start of said circular index.

26. The article of manufacture of claim 8 wherein said circular index size is increased in accordance with a predetermined expansion percentage.

27. The article of manufacture of claim 8 wherein said circular index size is decreased in accordance with a predetermined compression percentage.

28. The apparatus of claim 14 wherein an index position pointer points to an oldest item in said circular index, wherein said instructions store said requested item and said list position in said index element pointed to by said index position pointer, further comprising instructions that, in response to said current value of said performance indicator being less than a previous value of said performance indicator of said previous interval and said circular index size being increased in said previous interval, set an index position pointer to a start of said circular index.

29. The apparatus of claim 14 further comprising instructions that, in response to said current value of said performance indicator not being less than said previous value of said performance indicator and said circular index size not being increased in said previous interval and said circular index size being at said lower bound, set said value of said previous performance indicator to a low-value to force said circular index size to increase in a next interval.

30. The apparatus of claim 14 further comprising instructions that, in response to said current value of said performance indicator not being less than said previous value of said performance indicator and said circular index size being increased in said previous interval and said circular index size being at said upper bound, set said value of said previous performance indicator to a high-value to force said circular index size to decrease in a next interval.

* * * * *